US012413914B2

(12) United States Patent
Chen et al.

(10) Patent No.: US 12,413,914 B2
(45) Date of Patent: Sep. 9, 2025

(54) PIEZOELECTRIC MICROELECTROMECHANICAL SYSTEM MICROPHONE WITH COMPLIANT ANCHORS

(71) Applicant: SKYWORKS GLOBAL PTE. LTD., Singapore (SG)

(72) Inventors: Guofeng Chen, Fremont, CA (US); Yu Hui, Merced, CA (US); Myeong Gweon Gu, Seoul (KR); Jae Hyung Lee, Seoul (KR); Jae Myoung Jhung, Gangdong-gu (KR)

(73) Assignee: SKYWORKS GLOBAL PTE. LTD., Singapore (SG)

( * ) Notice: Subject to any disclaimer, the term of this patent is extended or adjusted under 35 U.S.C. 154(b) by 276 days.

(21) Appl. No.: 18/049,330

(22) Filed: Oct. 25, 2022

(65) Prior Publication Data

US 2023/0127983 A1 Apr. 27, 2023

Related U.S. Application Data

(60) Provisional application No. 63/272,252, filed on Oct. 27, 2021.

(51) Int. Cl.
*H04R 17/02* (2006.01)
*H04R 31/00* (2006.01)

(52) U.S. Cl.
CPC ............. *H04R 17/02* (2013.01); *H04R 31/00* (2013.01); *H04R 2201/003* (2013.01)

(58) Field of Classification Search
CPC .......................... H04R 31/00; H04R 2201/003
See application file for complete search history.

(56) References Cited

U.S. PATENT DOCUMENTS 8,948,419 B2 2/2015 Zhang
9,055,372 B2 6/2015 Grosh et al.
(Continued)

FOREIGN PATENT DOCUMENTS

CN 107128870 A 9/2017
EP 3557881 A1 10/2019
(Continued)

OTHER PUBLICATIONS

Chen et al. "Acoustic Transducers Built on Edge-released MEMS Structures," Solid-State Sensors, Actuators, and Microsystems Workshop Hilton Head Island, South Carolina, Jun. 6-10, 2010, pp. 234-237.

(Continued)

*Primary Examiner* — Sunita Joshi
(74) *Attorney, Agent, or Firm* — Lando & Anastasi, LLP

(57) ABSTRACT

A piezoelectric microelectromechanical system microphone comprises a support substrate, a diaphragm including a piezoelectric material attached to the support substrate and configured to deform and generate an electrical potential responsive to impingement of sound waves on the diaphragm, and a compliant anchor formed of a material with a greater compliance than a compliance of the piezoelectric material, the compliant anchor defined in the diaphragm in an anchor region between the piezoelectric material of the diaphragm and the support substrate to improve sensitivity and reduce residual stress impact of the piezoelectric microelectromechanical system microphone.

16 Claims, 22 Drawing Sheets

(56) References Cited

U.S. PATENT DOCUMENTS

| | | | |
|---|---|---|---|
| 9,832,573 | B2 | 11/2017 | Hall et al. |
| 9,902,612 | B2 | 2/2018 | Dehe et al. |
| 10,626,007 | B2 | 4/2020 | Bretthauer et al. |
| 10,964,880 | B2 | 3/2021 | Grosh et al. |
| 2008/0123878 | A1 | 5/2008 | Zhe et al. |
| 2009/0092273 | A1 | 4/2009 | Zhe et al. |
| 2011/0051985 | A1 | 3/2011 | Hwang et al. |
| 2013/0121509 | A1 | 5/2013 | Hsu et al. |
| 2016/0219374 | A1 | 7/2016 | Hall et al. |
| 2016/0219375 | A1 | 7/2016 | Hall et al. |
| 2017/0085994 | A1 | 3/2017 | Clerici et al. |
| 2017/0186940 | A1 | 6/2017 | Bevilacqua et al. |
| 2018/0091905 | A1 | 3/2018 | Clerici et al. |
| 2018/0299335 | A1 | 10/2018 | Wong et al. |
| 2019/0281393 | A1 | 9/2019 | Grosh et al. |
| 2019/0327562 | A1 | 10/2019 | Cerini et al. |
| 2020/0148532 | A1 | 5/2020 | Grosh et al. |
| 2020/0351595 | A1 | 11/2020 | Rusconi Clerici Beltrami et al. |
| 2020/0382876 | A1 | 12/2020 | Cerini et al. |
| 2021/0051413 | A1* | 2/2021 | Hui ...................... H10N 30/302 |
| 2021/0084423 | A1 | 3/2021 | Rusconi Clerici Beltrami et al. |
| 2021/0120346 | A1 | 4/2021 | Hui et al. |
| 2021/0136483 | A1* | 5/2021 | Hsieh ..................... H04R 19/04 |
| 2021/0385584 | A1 | 12/2021 | Goswami et al. |
| 2022/0073342 | A1 | 3/2022 | Ho et al. |
| 2022/0267141 | A1 | 8/2022 | Chen et al. |
| 2022/0272459 | A1 | 8/2022 | Chen et al. |
| 2022/0332568 | A1 | 10/2022 | Barsukou |
| 2022/0402752 | A1 | 12/2022 | Goswami et al. |
| 2023/0007405 | A1 | 1/2023 | Qian et al. |
| 2023/0011561 | A1 | 1/2023 | Qian et al. |
| 2023/0012046 | A1 | 1/2023 | Qian et al. |
| 2023/0039743 | A1 | 2/2023 | Hui et al. |
| 2023/0072672 | A1 | 3/2023 | Chen et al. |
| 2023/0104257 | A1 | 4/2023 | Barsukou et al. |
| 2023/0105699 | A1 | 4/2023 | Chen et al. |
| 2023/0188896 | A1 | 6/2023 | Barsukou |
| 2023/0234837 | A1 | 7/2023 | Chen et al. |
| 2023/0239641 | A1 | 7/2023 | Chen et al. |
| 2023/0303387 | A1 | 9/2023 | Barsukou |
| 2024/0098426 | A1 | 3/2024 | Barsukou |

FOREIGN PATENT DOCUMENTS

| | | | |
|---|---|---|---|
| JP | 2008118639 | A | 5/2008 |
| JP | 2019140638 | A | 8/2019 |
| KR | 101058475 | B1 | 8/2011 |

OTHER PUBLICATIONS

Chen et al., "Edge-released, piezoelectric MEMS acoustic transducers in array configuration," J. Micromech. Microeng. 22 (2012) 025005, pp. 1-9.

Huang et al., "High Sensitivity and High S/N Microphone Achieved by PZT Film with Central-Circle Electrode Design", IEEE, MEMS 2017, Las Vegas, NV, USA, Jan. 22-26, 2017, pp. 1188-1191.

Je et al., "In situ tuning of a MEMS microphone using electrodeposited nanostructures," Journal of Micromechanics and Microengineering, 19 (2009) 035015, pp. 1-8.

Je et al., "MEMS Capacitive Microphone with Dual-Anchored Membrane", Proceedings 2017, 1, 342; Aug. 9, 2017.

Knisely et al., "Method for Controlling Stress Gradients in PVD Aluminum Nitride", Journal of Micromechanics and Microengineering, vol. 28, No. 11, 2018.

Littrell, "High Performance Piezoelectric MEMS Microphones", A dissertation submitted in partial fulfillment of the requirements for the degree of Doctor of Philosophy (Mechanical Engineering) in The University of Michigan, 2010, 111 pages.

Lo et al., "Development of a No. Back-Plate SOI MEMS Condenser Microphone," IEEE, Transducers 2015, Anchorage, Alaska, Jun. 21-25, 2015, pp. 1085-1088.

Lo et al., "Sensitivity Improvement of No-Back-Plate MEMS Microphone Using Polysilicon Trench-refilled Process," IEEE, Transducers 2017, Kaohsiung, Taiwan, Jun. 18-22, 2017, pp. 1171-1174.

Mohamad et al., "Modelling and Optimisation of a Spring-Supported Diaphragm Capacitive MEMS Microphone", Engineering, 2010, 2, 762-770.

Peña-García et al., "Design and Modeling of a MEMS Dual-Backplate Capacitive Microphone with Spring-Supported Diaphragm for Mobile Device Applications," Sensors (2018), 18, 3545, 30 pages.

Pulskamp et al. "Mitigation of residual film stress deformation in multilayer microelectromechanical systems cantilever devices." Journal of Vacuum Science & Technology B: Microelectronics and Nanometer Structures Processing, Measurement, and Phenomena 21.6 (2003): 2482-2486.

Segovia-Fernandez et al., "Monolithic Piezoelectric Aluminum Nitride MEMS-CMOS Microphone", IEEE (2017), Transducers 2017, Kaohsiung, Taiwan, Jun. 18-22, 2017, pp. 414-417.

Shah et al., "Design Approaches of MEMS Microphones for Enhanced Performance", Hindawi, Journal of Sensors, vol. 2019, Article ID 9294528, Mar. 6, 2019, 26 pages.

Udvardi et al., Spiral-Shaped Piezoelectric MEMS Cantilever Array for Fully Implantable Hearing Systems. Micromachines (2017) 8, 311, 13 pages.

Williams et al., "An AIN MEMS Piezoelectric Microphone for Aeroacoustic Applications", Journal of Microelectromechanical Systems, vol. 21, No. 2, Apr. 2012, pp. 270-283.

Yamashita et al., "Diaphragm deflection control of piezoelectric ultrasonic microsensors for sensitivity improvement", Sensors and Actuators A 139 (2007), pp. 118-123.

Yan et al., "Corrugated Diaphragm for Piezoelectric Microphone", IEEE, 1996, pp. 503-506.

* cited by examiner

PIEZOELECTRIC MICROELECTROMECHANICAL SYSTEM MICROPHONE WITH COMPLIANT ANCHORS

CROSS-REFERENCE TO RELATED APPLICATIONS

This application claims priority under 35 U.S.C. § 119(e) to U.S. Provisional Patent Application Ser. No. 63/272,252, titled "PIEZOELECTRIC MICROELECTROMECHANICAL SYSTEM MICROPHONE WITH COMPLIANT ANCHORS," filed Oct. 27, 2021, the entire contents of which is incorporated by reference herein for all purposes.

BACKGROUND

Technical Field

Embodiments disclosed herein relate to piezoelectric microelectromechanical system microphones and to devices including same.

Description of Related Technology

A microelectromechanical system (MEMS) microphone is a micro-machined electromechanical device to convert sound pressure (e.g., voice) into an electrical signal (e.g., voltage). MEMS microphones are widely used in mobile devices such as cellular telephones, headsets, smart speakers, and other voice-interface devices/systems. Capacitive MEMS microphones and piezoelectric MEMS microphones (PMMs) are both available in the market. PMMs requires no bias voltage for operation, therefore, they provide lower power consumption than capacitive MEMS microphones. The single membrane structure of PMMs enable them to generally provide more reliable performance than capacitive MEMS microphones in harsh environments. Existing PMMs are typically based on either cantilever MEMS structures or diaphragm MEMS structures. PMMs with cantilever structures may suffer from poor low frequency roll off control as the gap between cantilevers varies when cantilevers deflect due to residual stress. PMMs with cantilever structures may also have lower sensitivity than PMMs with diaphragm structures as they collect piezoelectric charges only at the edge. PMMs with diaphragm structures do not suffer from low frequency roll off variations. Additionally, they are able to collect more piezoelectric charges both at the edge and the center of diaphragm, and may thus provide higher output energy than PMMS with cantilever structures.

SUMMARY

In accordance with one aspect, there is provided a piezoelectric microelectromechanical system microphone. The piezoelectric microelectromechanical system microphone comprises a support substrate, a diaphragm including a piezoelectric material attached to the support substrate and configured to deform and generate an electrical potential responsive to impingement of sound waves on the diaphragm, and a compliant anchor formed of a material with a greater compliance than a compliance of the piezoelectric material, the compliant anchor defined in the diaphragm in an anchor region between the piezoelectric material of the diaphragm and the support substrate to improve sensitivity and reduce residual stress impact of the piezoelectric microelectromechanical system microphone.

In some embodiments, the compliant anchor extends about a majority of a perimeter of the diaphragm.

In some embodiments, the diaphragm is circular.

In some embodiments, the compliant anchor has a length and substantially same width along an entirety of the length.

In some embodiments, the compliant anchor has a width of between 0% and about 15% of a radius of the diaphragm.

In some embodiments, the compliant anchor has a same height as a remainder of the diaphragm.

In some embodiments, the piezoelectric microelectromechanical system microphone further comprises a sensing electrode including an inner sensing electrode disposed proximate a center of the diaphragm and an outer sensing electrode disposed proximate a perimeter of the diaphragm.

In some embodiments, the anchor region surrounds the outer sensing electrode.

In some embodiments, the compliant anchor is formed of a polymer.

In some embodiments, the compliant anchor is formed of one of polyimide, polymethylmethacrylate, or polydimethylsiloxane.

In some embodiments, the compliant anchor is formed of a dielectric material.

In some embodiments, the compliant anchor is formed of silicon dioxide.

In some embodiments, the compliant anchor is formed of a semiconductor.

In some embodiments, the compliant anchor is formed of silicon.

In some embodiments, the piezoelectric microelectromechanical system microphone is included in an electronics device module.

In some embodiments, the electronics device module is included in an electronic device.

In some embodiments, the electronics device module is included in a telephone.

In accordance with another aspect, there is provided a method of forming a piezoelectric microelectromechanical system microphone. The method comprises attaching a diaphragm including a piezoelectric material configured to deform and generate an electrical potential responsive to impingement of sound waves on the diaphragm to a support substrate with a compliant anchor formed of a material with a greater compliance than a compliance of the piezoelectric material, the compliant anchor defined in the diaphragm in an anchor region between the piezoelectric material of the diaphragm and the support substrate to improve sensitivity and reduce residual stress impact of the piezoelectric microelectromechanical system microphone.

In some embodiments, the method further comprises forming the compliant anchor about a majority of a perimeter of the diaphragm.

In some embodiments, the method further comprises forming the compliant anchor from a polymer.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
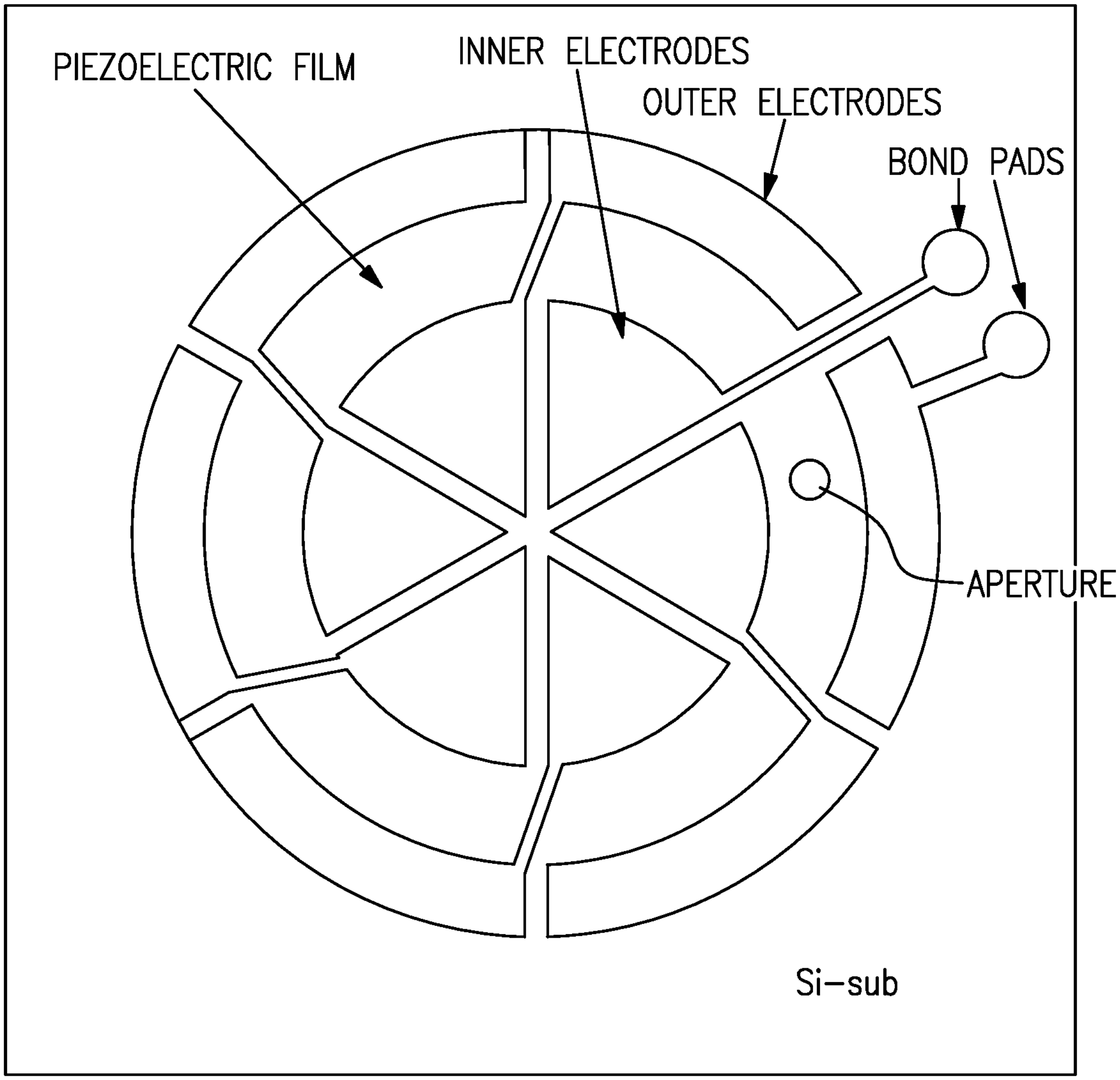
FIG. 1A is a plan view of an example of a diaphragm PMM.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Aspects and embodiments disclosed herein involve engineering of the anchor structure of a diaphragm based piezoelectric microelectromechanical system microphone (PMM) to improve the sensitivity and/or to reduce the size of the PMM while maintaining sensitivity. In various aspects and embodiments, the anchor structure includes a material that is more compliant than the piezoelectric material of the diaphragm.

Figure 1B:
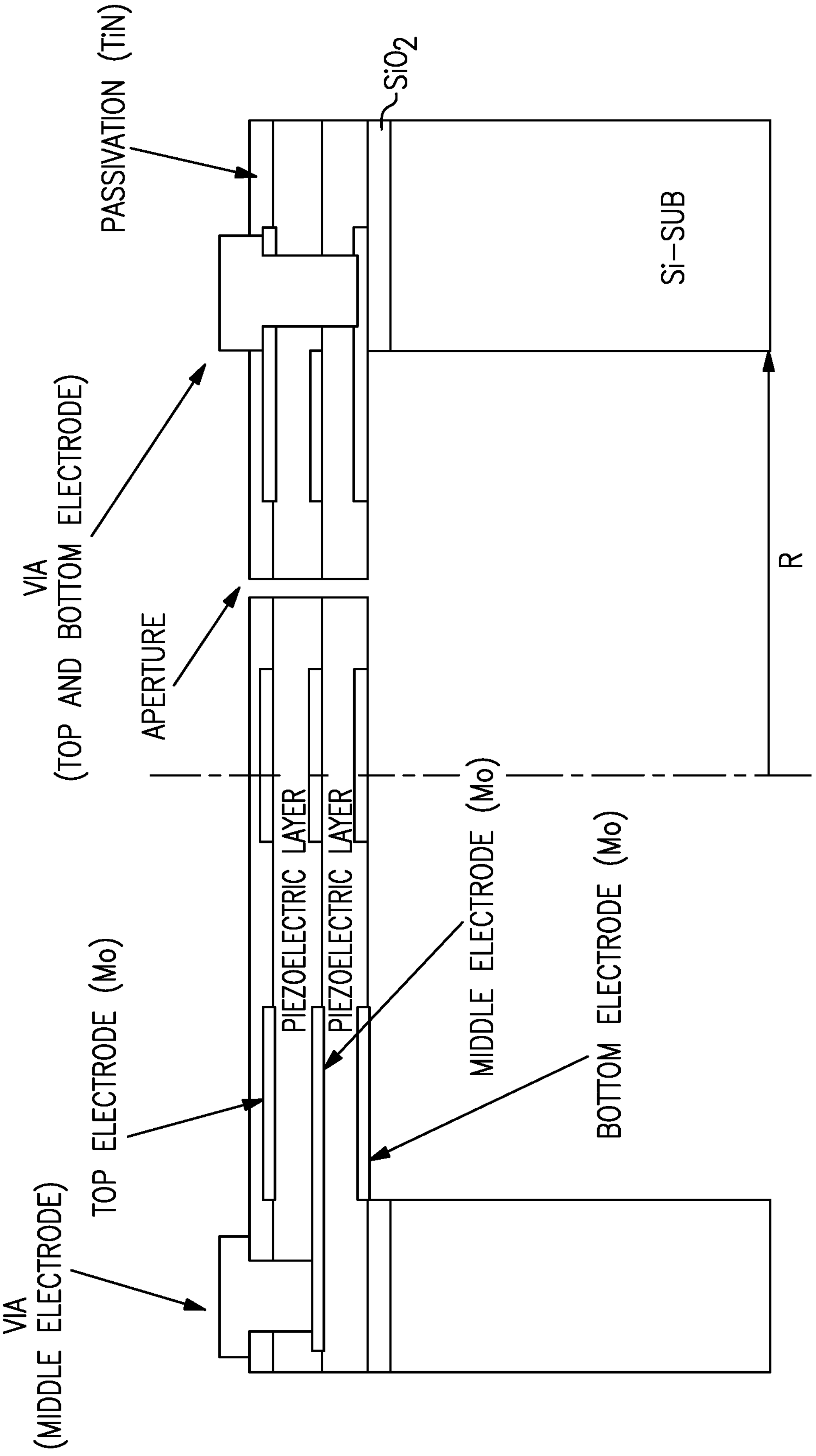
FIG. 1B is a cross-sectional view of the diaphragm PMM of FIG. 1A.

An example of a diaphragm-type PMM is illustrated in a top-down plan view in FIG. 1A and in cross-sectional view in FIG. 1B.

The diaphragm of the PMM may be formed of a piezoelectric material, for example, aluminum nitride (AlN), that generates a voltage difference across different portions of the diaphragm when the diaphragm deforms or vibrates due to the impingement of sound waves on the diaphragm. Although illustrated as circular in FIG. 1A, the diaphragm may have a circular, rectangular, or polygonal shape. In the example of FIGS. 1A and 1B, the diaphragm structure is fully clamped all around its perimeter by adhesion of the entire perimeter of the piezoelectric material of the diaphragm to a layer of $SiO_2$ disposed on a Si substrate. This is referred to herein as a "full anchor" structure. To improve low-frequency roll-off control ($f_{-3dB}$ control) one or more vent holes or apertures may be formed in the diaphragm structure that may be well defined by photolithography.

The diaphragm PMM of FIGS. 1A and 1B has a circular diaphragm formed of two layers of piezoelectric material, for example, AlN, that is clamped at its periphery on layers of $SiO_2$ formed on a Si substrate with a cavity defined in the substrate below the diaphragm. The circular diaphragm PMM includes a plurality of pie-piece shaped sensing/active inner electrodes disposed in the central region of the diaphragm that are segmented and separated from one another by gaps. Outer sensing/active electrodes, segmented and separated circumferentially from one another by gaps, are positioned proximate a periphery of the diaphragm and extend inward from the clamped periphery a partial of the radius of the diaphragm toward the inner electrodes. Each outer sensing electrode is directly electrically connected to a corresponding inner sensing electrode by an electrical trace or conductor segment. Open areas that are free of sensing/active electrodes are defined between the inner electrodes and outer electrodes.

The inner electrodes and outer electrodes each include top or upper electrodes disposed on top of an upper layer of piezoelectric material of the diaphragm, bottom or lower electrodes disposed on the bottom of the lower layer of piezoelectric material of the diaphragm, and middle electrodes disposed between the upper and lower layers of piezoelectric material. The multiple inner and outer electrodes are electrically connected in series between the two bond pads, except for inner and outer electrode segment pairs having electrical connection directly to the bond pads. The top and bottom electrodes of each inner and outer electrode segment pair are electrically connected to the middle electrode in an adjacent inner and outer electrode segment pair. Vias to the middle electrode of one inner and outer electrode segment pair and to the top and bottom electrodes of an adjacent inner and outer electrode segment pair are used to provide electrical connection between the bond pads and electrodes. The electrodes are indicated as being Mo, but could alternatively be Ru or any other suitable metal, alloy, or non-metallic conductive material.

Diaphragm structures generate maximum stress and piezoelectric charges in the center and near the edge of the diaphragm anchor. The charges in the center and edge have opposite polarities. Additionally, diaphragm structures generate piezoelectric charges at the top and the bottom surfaces and the charge polarities are opposite on the top and bottom surfaces in the same area. Partial sensing electrodes in the diaphragm center and near the anchor may be used for maximum output energy and sensitivity and to minimize parasitic capacitance.

A diaphragm PMM may include one, two, or multiple piezoelectric material film layers in the diaphragm. In embodiments including two piezoelectric material film layers, conductive layers forming sensing/active electrodes may be deposited on the top and the bottom of the diaphragm, as well as between the two piezoelectric material film layers, forming a bimorph diaphragm structure. Partial sensing electrodes may be employed. Inner electrodes may be placed in the center of the diaphragm and outer electrodes may be placed near the anchor/perimeter of the diaphragm. Sensing/active electrodes may be placed on the bottom and top, and in the middle of the vertical extent of the multi-layer piezoelectric film forming the diaphragm. The size of the sensing/active electrodes may be selected to collect the maximum output energy ($E=0.5*C*V^2$).

It has been discovered that the sensitivity of a diaphragm PMM may be improved by increasing the compliance of the diaphragm at the anchor region of the piezoelectric diaphragm proximate where it is adhered to its supporting substrate. Such a structure is referred to herein as a compliant anchor diaphragm PMM.

Figure 2A:
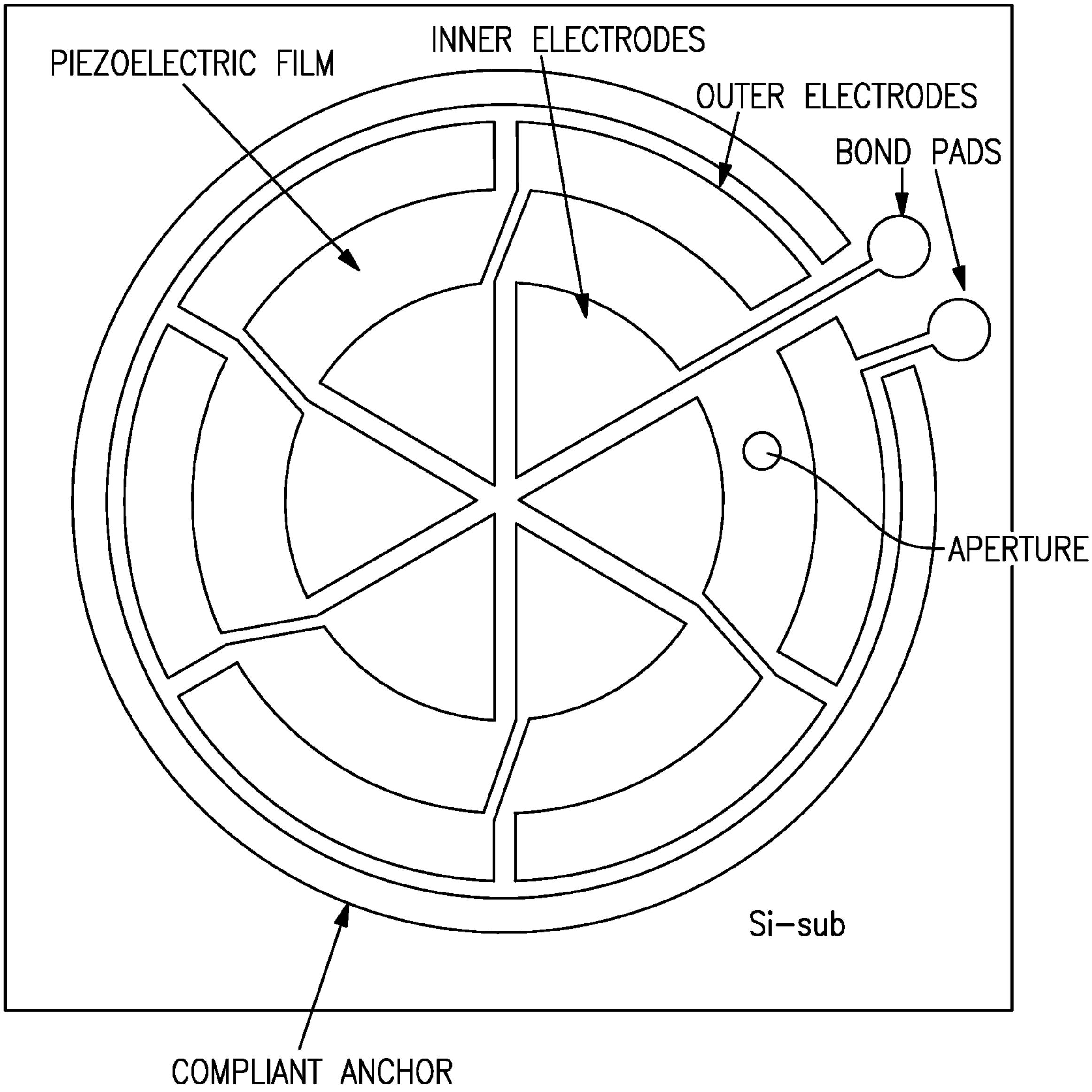
FIG. 2A is a plan view of an example of a diaphragm PMM including a compliant anchor.
Figure 2B:
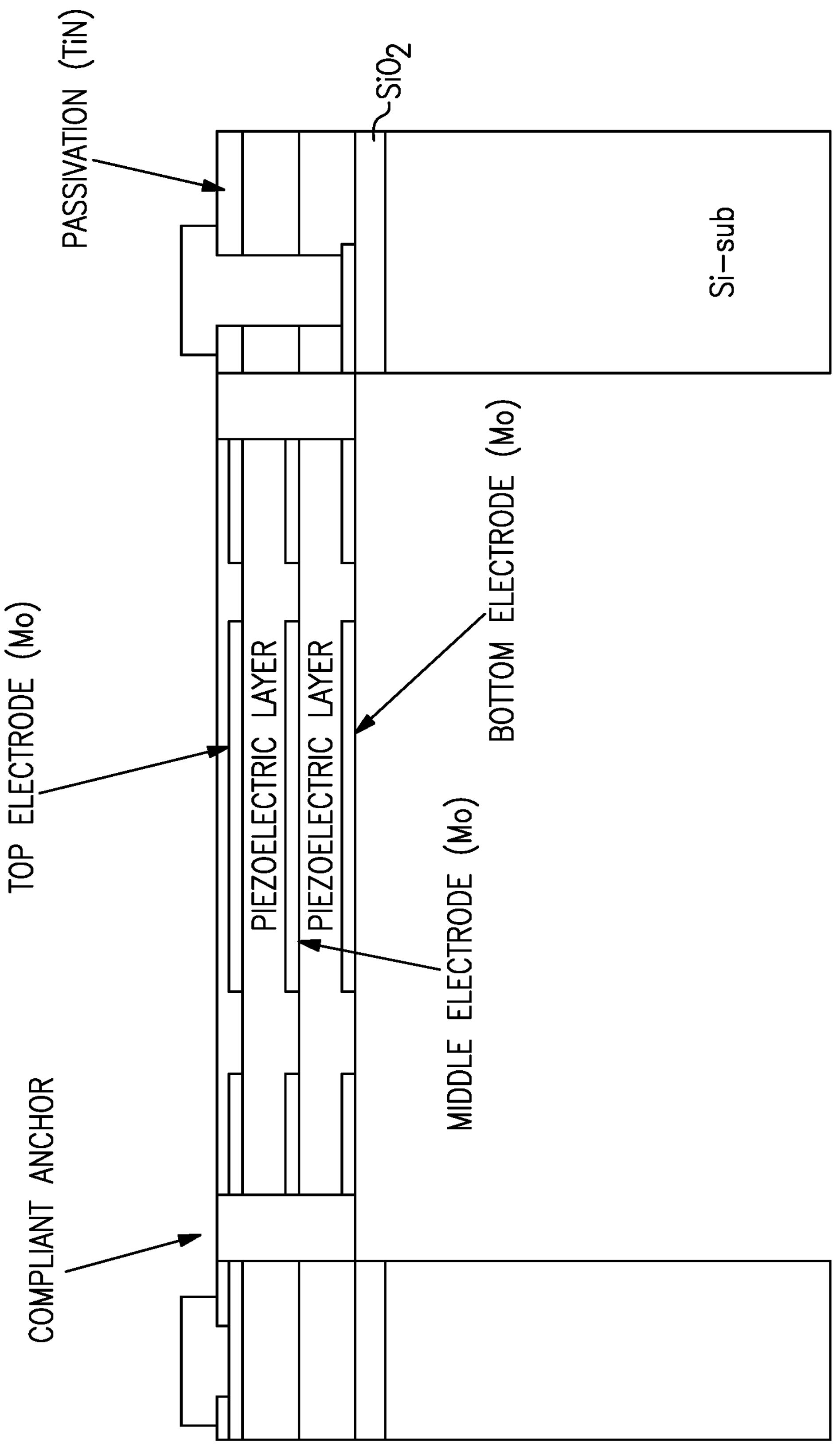
FIG. 2B is a cross-sectional view of the diaphragm PMM of FIG. 2A.

One example of a compliant anchor diaphragm PMM is illustrated in a top-down plan view in FIG. 2A and in a cross-sectional view in FIG. 2B. As illustrated in FIGS. 2A and 2B, in a partial ring in the anchor region of the diaphragm, the piezoelectric material is replaced with a film of a material having a greater compliance or lower Young's modulus than the piezoelectric material in the remainder of the diaphragm. The compliant material may form a ring throughout the majority of the anchor region. The compliant material ring, or compliant material anchor, is broken in an area to provide for the electrical contacts for the electrodes to pass from the diaphragm structure to the bond pads. In diaphragm PMMs having other shapes, for example, rectangular, square, or otherwise polygonal, the compliant material layer may extend about a majority of a perimeter of the diaphragm in the anchor region. The compliant material layer forms a compliant anchor for the diaphragm. In some embodiments, the width of the compliant material layer may be up to about 15% of the radius of the diaphragm structure, for example, about 10 μm or greater in width, and may have a substantially constant width along its full length. The compliant material layer may have a height or thickness corresponding to the combined thickness of the piezoelectric material layers and passivation layer of the diaphragm and thus may be flush with the lower and upper surfaces of the diaphragm. In other embodiments, the compliant material layer may have a height or thickness greater than or lesser than the combined thickness of the piezoelectric material layers and passivation layer of the diaphragm.

The compliant material may be a polymer, for example, polyimide, polymethylmethacrylate (PMMA), or polydimethylsiloxane (PDMS), a dielectric, for example, silicon dioxide, or a semiconductor, for example, silicon. The compliant material in the anchor region of the diaphragm PMM provides for the diaphragm to more easily be displaced/vibrated by impingement of sound waves on the diaphragm and to vibrate with a greater amplitude for a given sound pressure than if the anchor was formed entirely of the piezoelectric material, thus increasing the sensitivity of the PMM.

Figure 3:
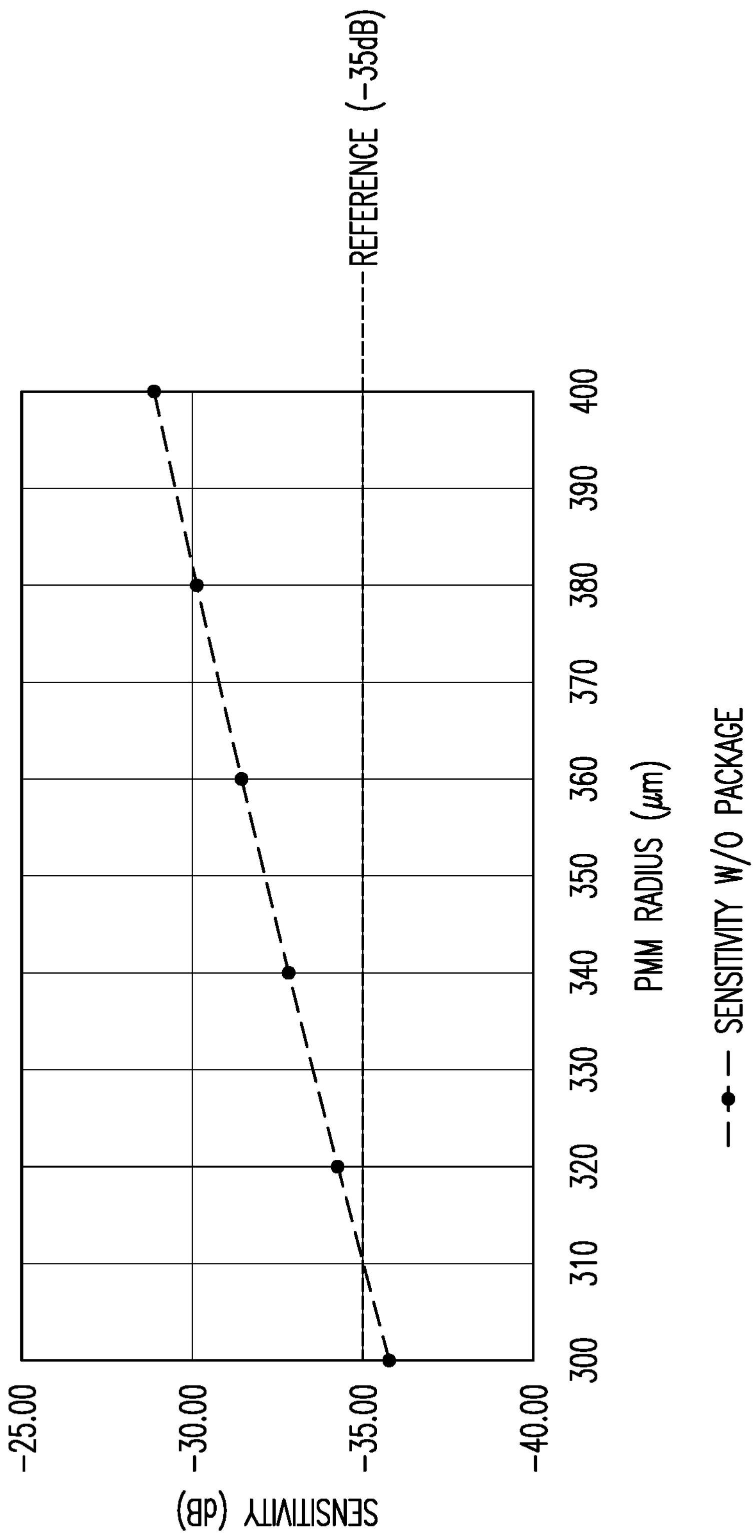
FIG. 3 is a chart of sensitivity as a function of radius for an unpackaged PMM including a compliant anchor.

Results of a simulation of sensitivity vs. diaphragm radius for an unpackaged diaphragm PMM having a 10 μm layer wide compliant anchor structure formed of PMMA and two layers of 300 nm thick AlN forming the diaphragm structure is illustrated in FIG. 3. A reference line showing the sensitivity of an unpackaged conventional diaphragm PMM such as illustrated in FIGS. 1A and 1B with a diaphragm radius of 400 μm is also provided in FIG. 3 for reference. The sensitivity of the conventional diaphragm structure for the frequency of sound used in the simulation was −35 dBV. The diaphragm PMM including the compliant anchor could achieve a sensitivity matching that of the conventional PMM with a 400 μm radius when the radius of the diaphragm PMM including the compliant anchor was reduced to 310 μm. This means the PMM size could be significantly reduced. If the radius of the diaphragm PMM including the compliant anchor was set at 400 μm it exhibited a sensitivity of over 5 dBV greater than that of the conventional diaphragm PMM.

Figure 4:
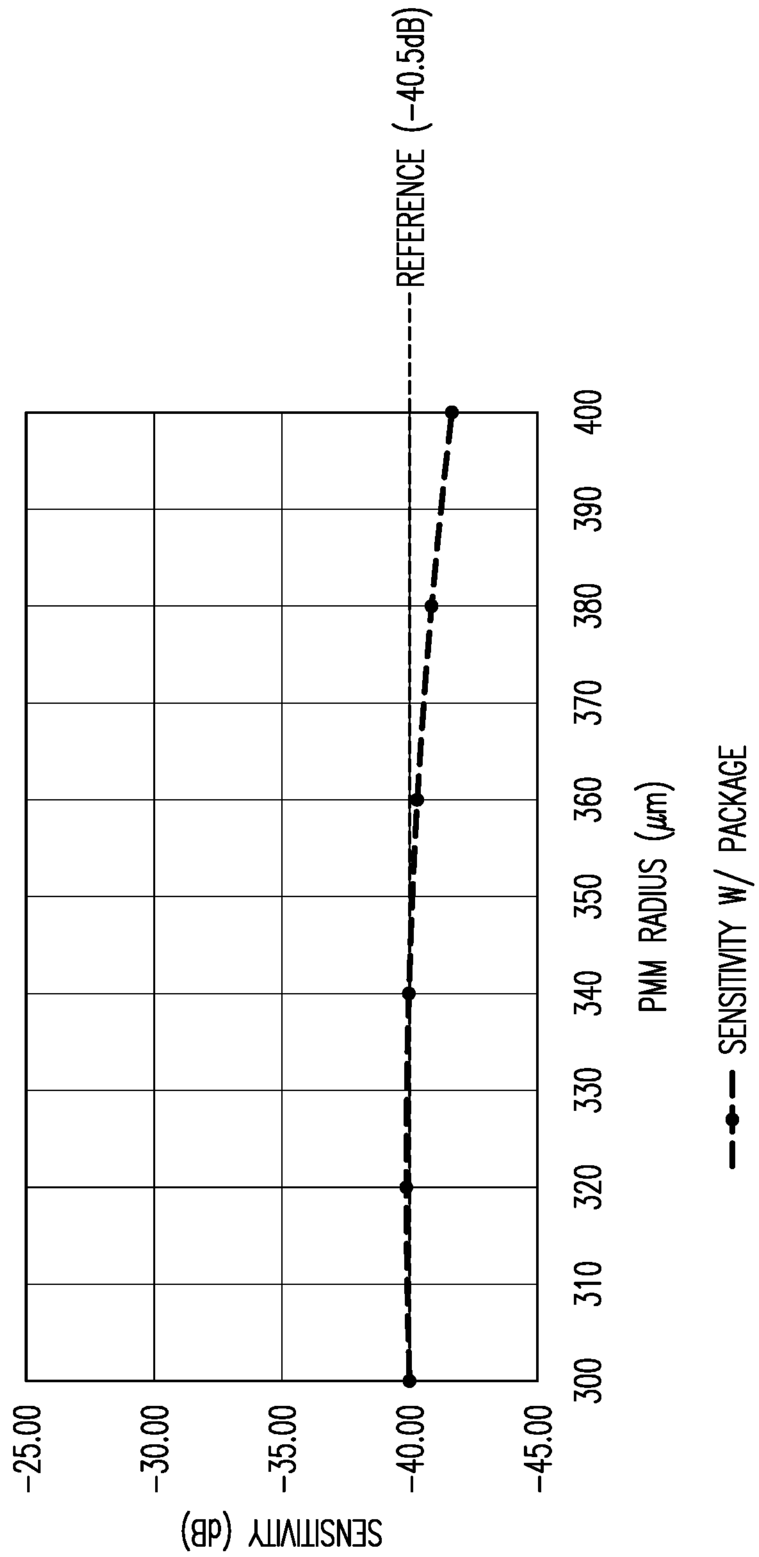
FIG. 4 is a chart of sensitivity as a function of radius for a packaged PMM including a compliant anchor.

Once a diaphragm PMM is packaged its sensitivity decreases by adding a finite back volume compliance in series with the PMM compliance. Results of a simulation of sensitivity vs. diaphragm radius for a packaged diaphragm PMM having a 10 μm layer wide compliant anchor structure formed of PMMA and two layers of 300 nm thick AlN forming the diaphragm structure is illustrated in FIG. 4. A reference line showing the sensitivity of a packaged conventional diaphragm PMM such as illustrated in FIGS. 1A and 1B with a diaphragm radius of 400 μm is also provided in FIG. 4 for reference. The sensitivity of the packaged conventional diaphragm structure for the frequency of sound used in the simulation was −40.5 dBV. The packaged diaphragm PMM including the compliant anchor could achieve a sensitivity matching or exceeding that of the conventional PMM with a 400 μm radius when the radius of the diaphragm PMM including the compliant anchor was between 300 μm and 360 μm. The microphone sensitivity in a package is determined by the compliance ratio between PMM diaphragm and back cavity (the volume enclosure by the housing/lid). Maximum sensitivity may be achieved when the two compliances are equal. Below or above this ratio, the sensitivity starts to drop. In the example of FIG. 4 the radius to give this maximum sensitivity is ~320 μm.

Figure 5:
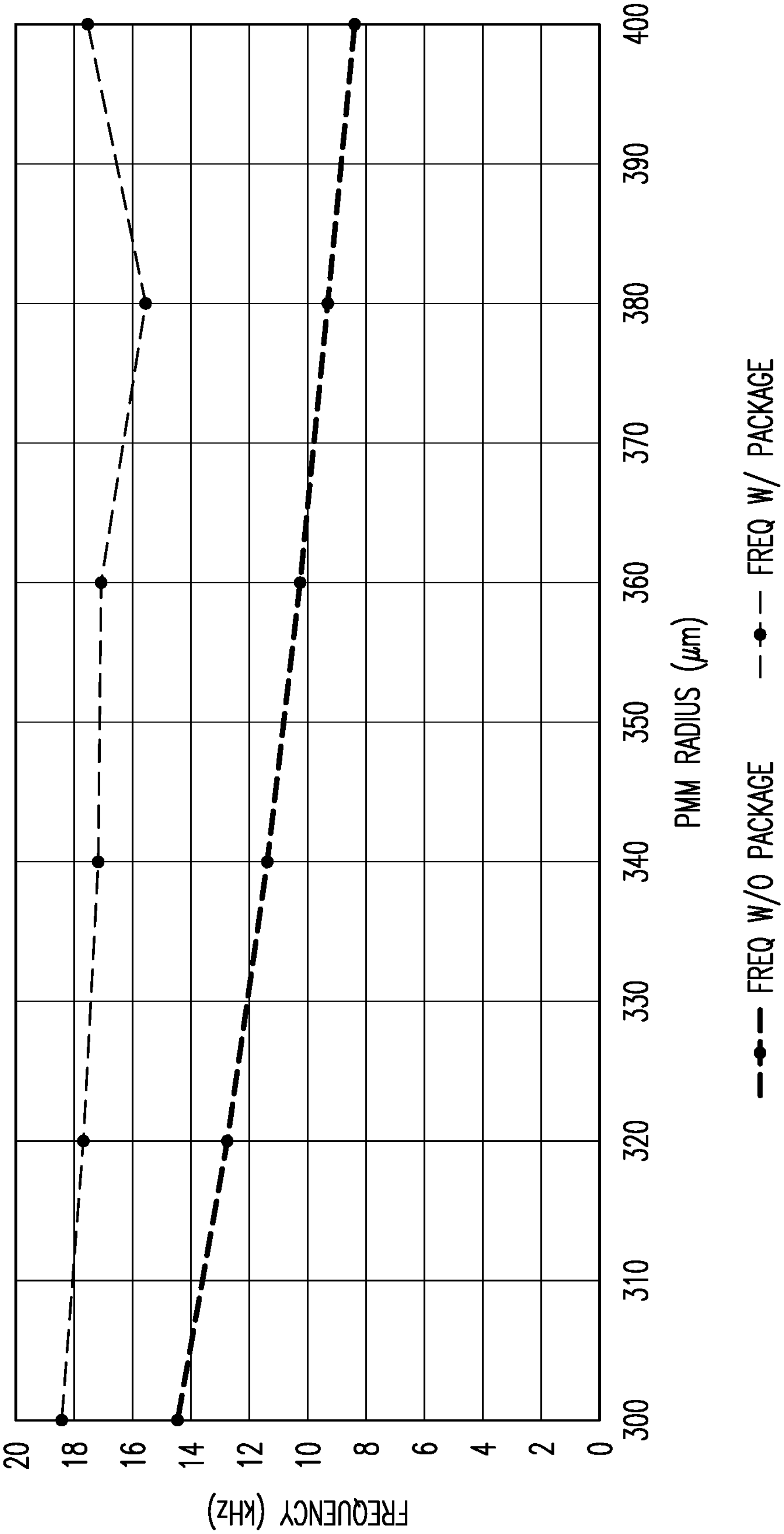
FIG. 5 is a chart of resonant frequency as a function of radius for a packaged and for an unpackaged PMM including a compliant anchor.

A simulation was performed to determine the resonant frequency of a diaphragm PMM having a 10 μm wide compliant anchor structure formed of PMMA and two layers of 300 nm thick AlN forming the diaphragm structure when both packaged and unpackaged. The resonant frequency of a PMM is important because it generally defines an upper limit of frequencies that the PMM is sensitive to. The results of the simulation are shown in FIG. 5. The resonant frequency of the packaged diaphragm PMM with the compliant anchor structure was above about 16 kHz when the diaphragm radius was between 300 μm and 400 μm, which indicates that the microphone would be sensitive to frequencies in a range associated with normal human speech.

Figure 6:
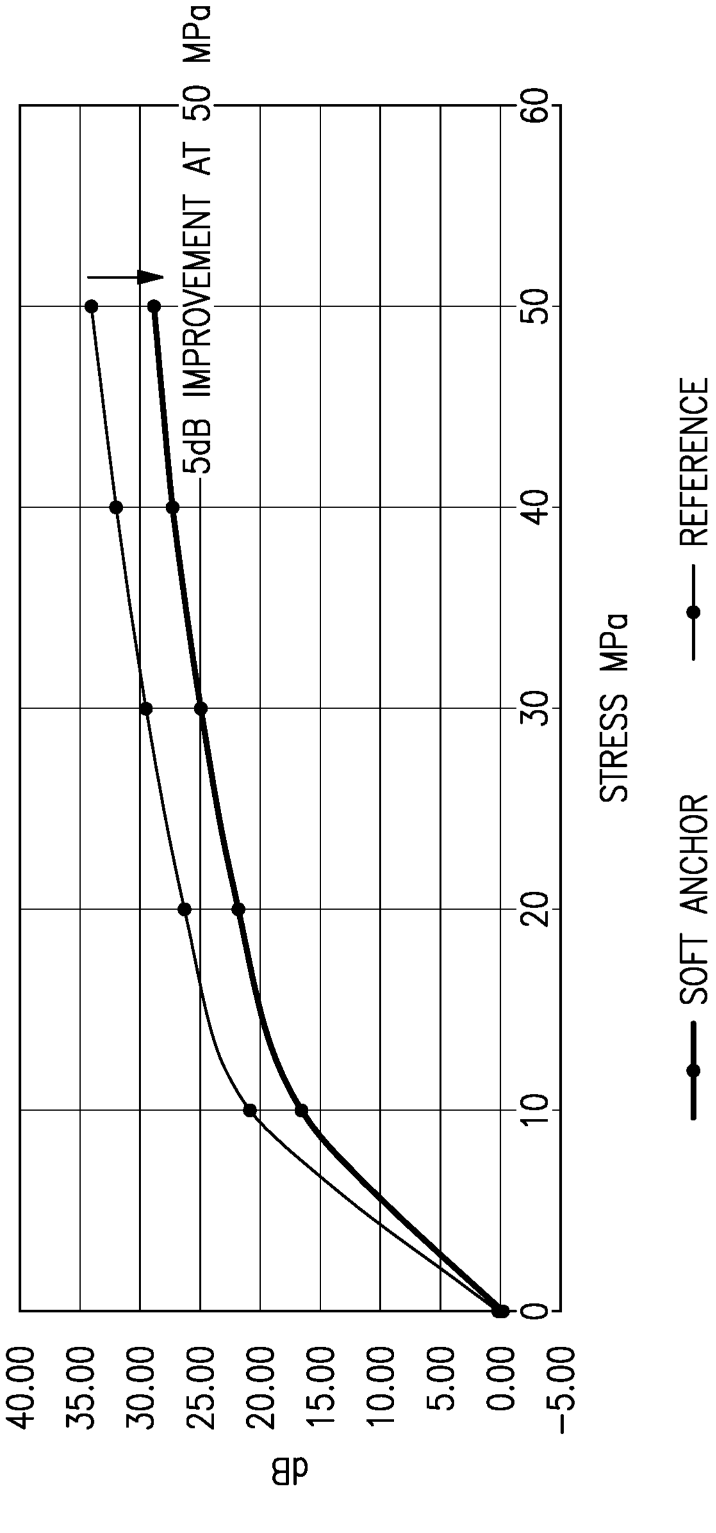
FIG. 6 is a chart of sensitivity degradation as a function of piezoelectric film residual stress for a PMM including a compliant anchor.

It was discovered that providing a diaphragm PMM with compliant anchors can reduce the degradation in sensitivity observed when the piezoelectric material of the PMM exhibited residual stress. Without wishing to be bound to a particular theory, it is believed that the material of the compliant anchor may deform to relieve some of the residual stress in the piezoelectric material of the PMM. FIG. 6 illustrates results of a simulation that indicate that in a diaphragm PMM with a radius of 300 μm and including piezoelectric material exhibiting a residual stress of 50 MPa, the sensitivity degradation of the diaphragm PMM with a compliant anchor ("Soft_Anchor" curve) was improved by 5 dB as compared to the sensitivity degradation of a similar diaphragm PMM without a compliant anchor ("Reference" curve).

Figure 7A:
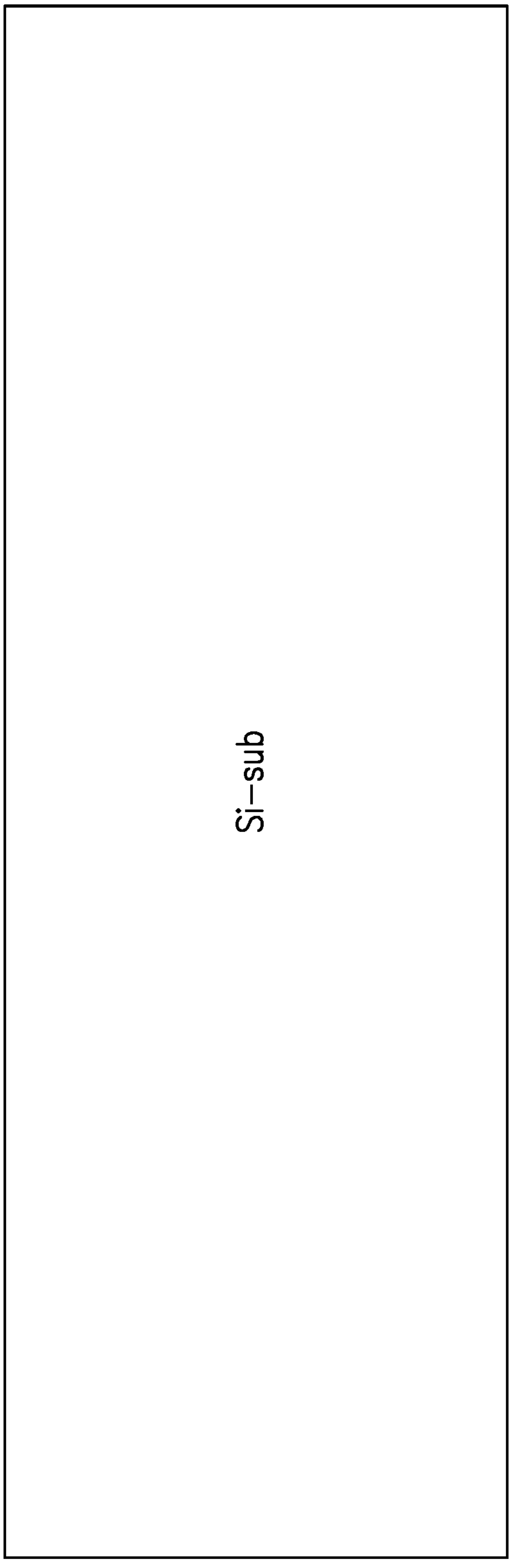
FIGS. 7A-7I illustrate steps in a process for fabricating a PMM including a compliant anchor as disclosed herein.
Figure 7B:
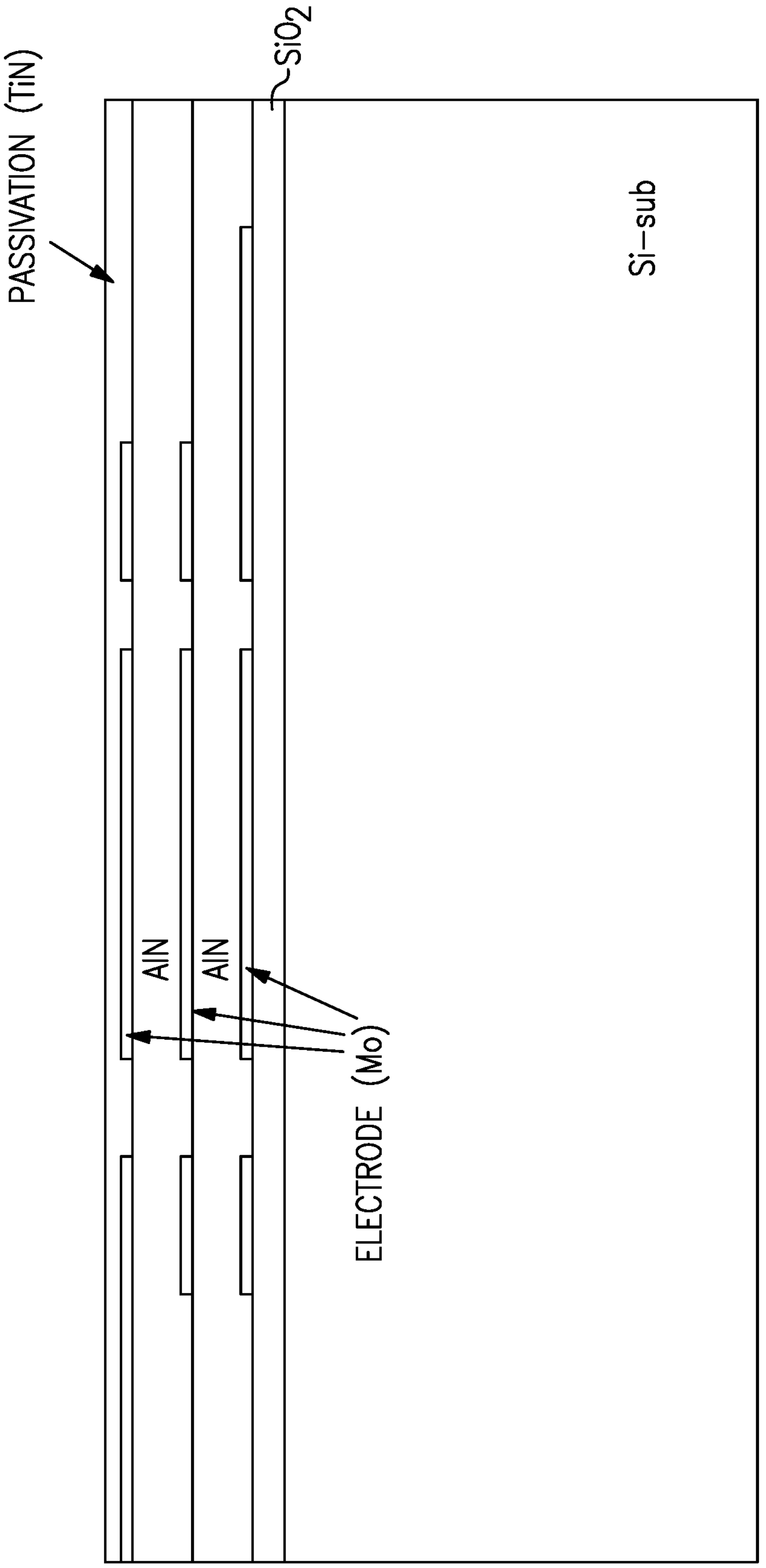
Figure 7C:
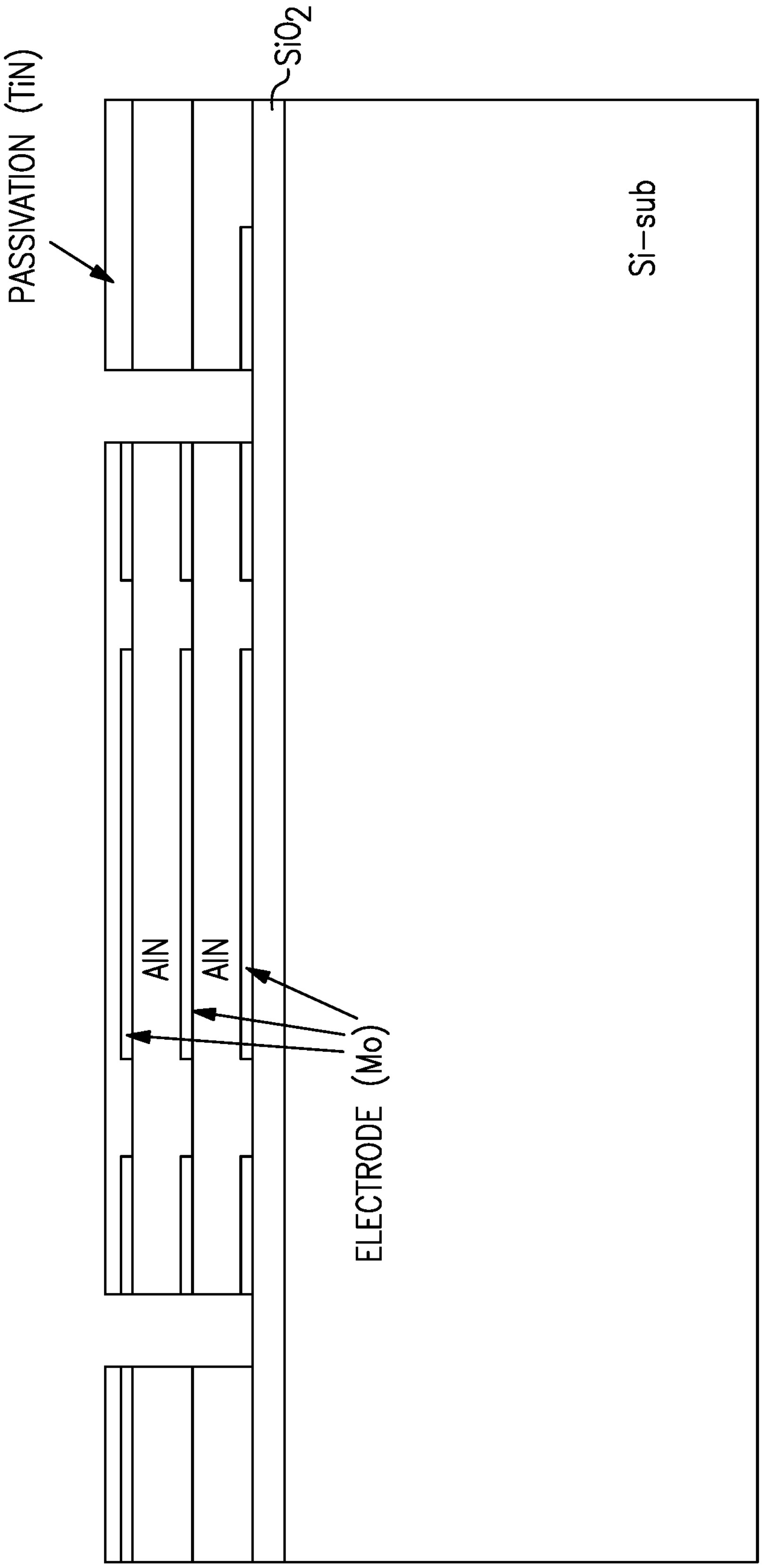
Figure 7D:
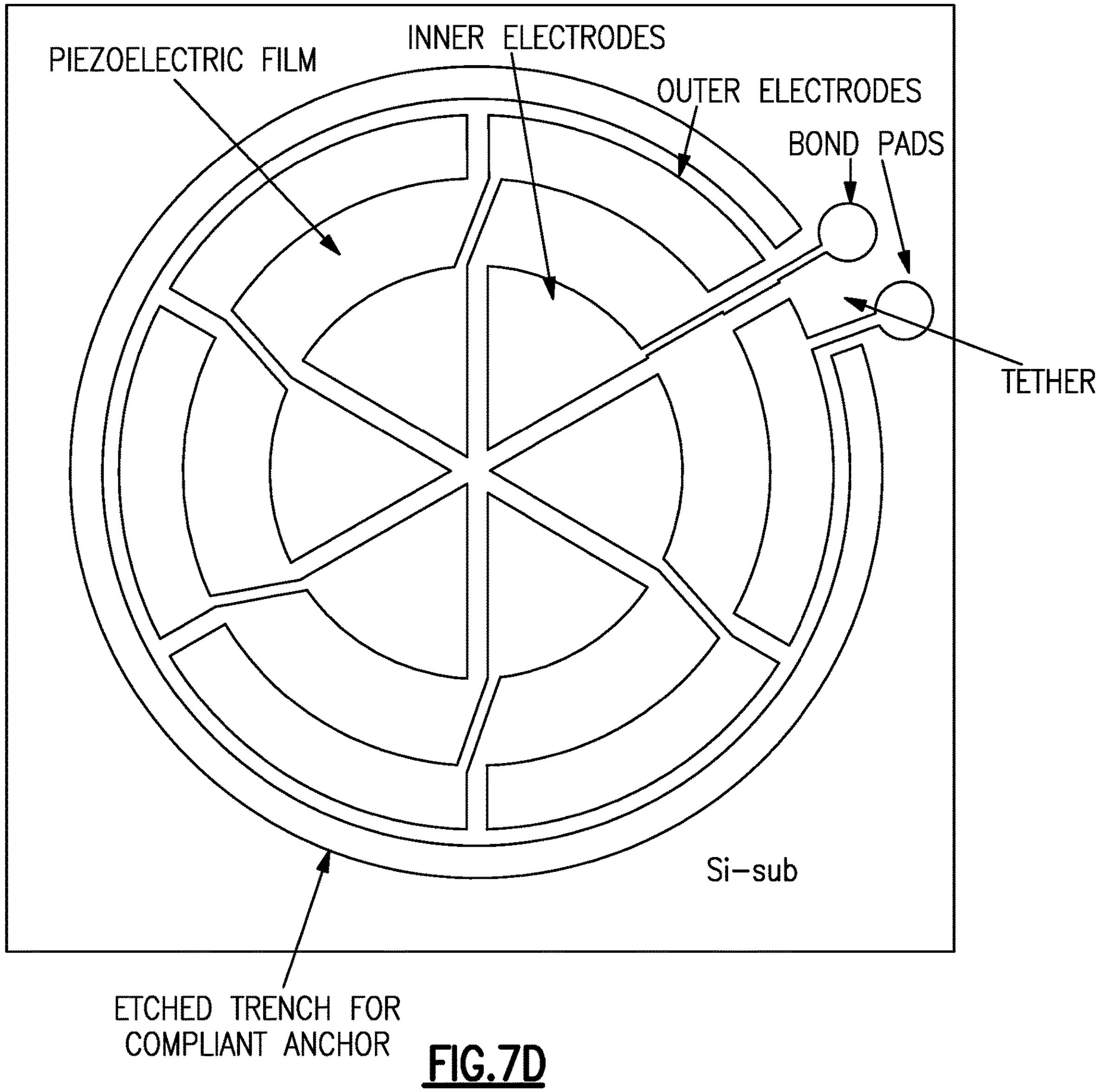
Figure 7E:
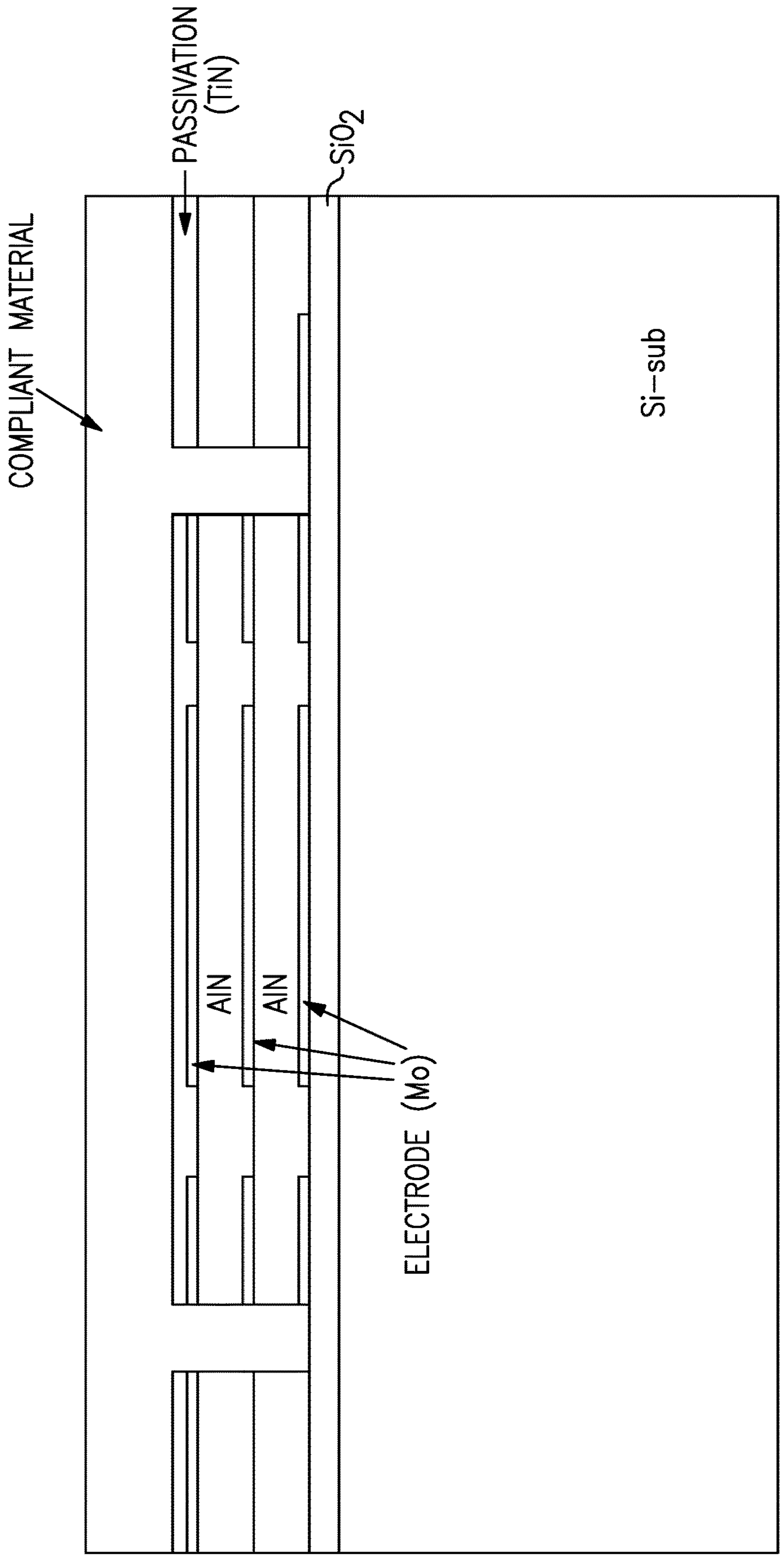
Figure 7F:
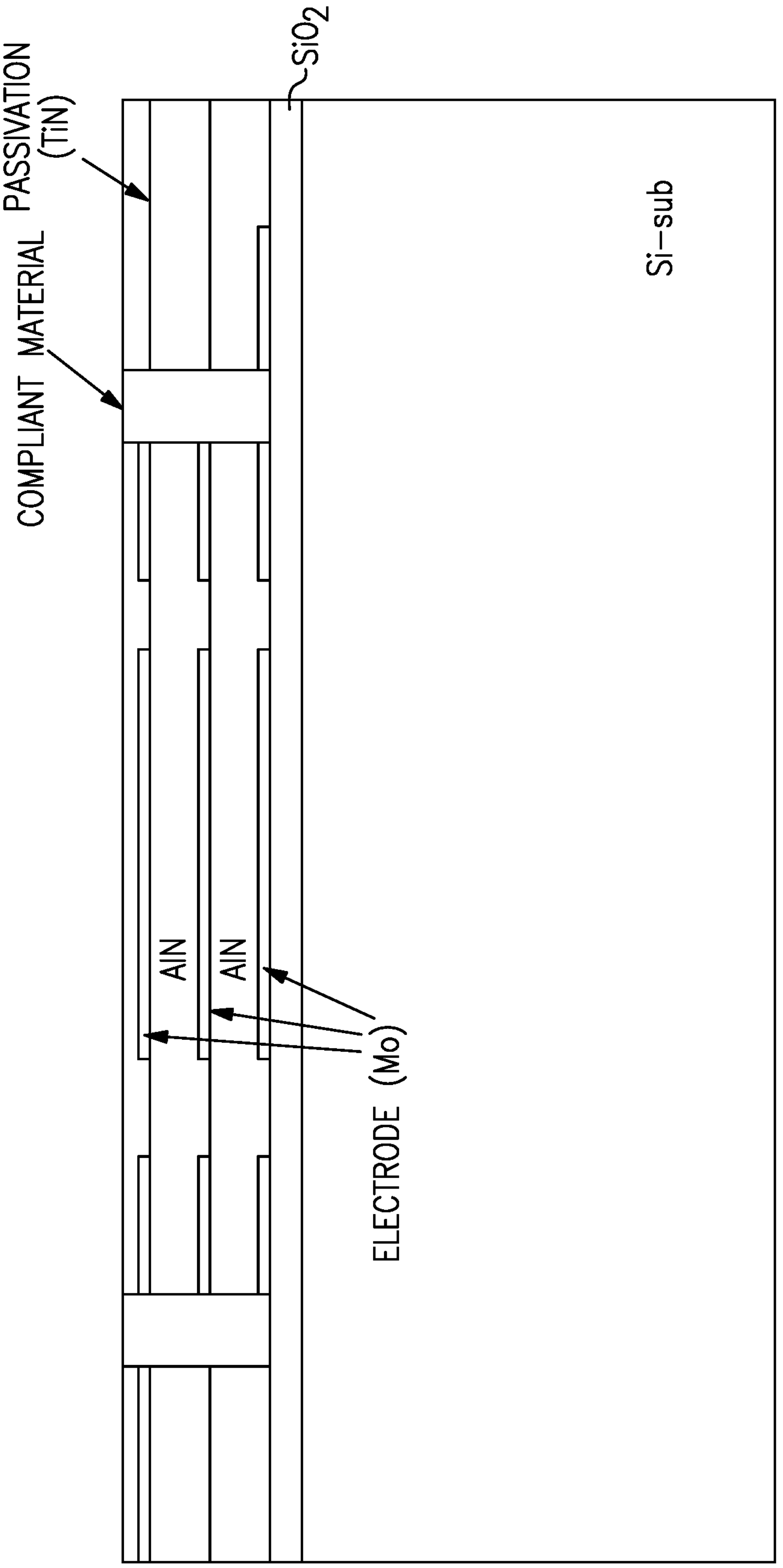
Figure 7G:
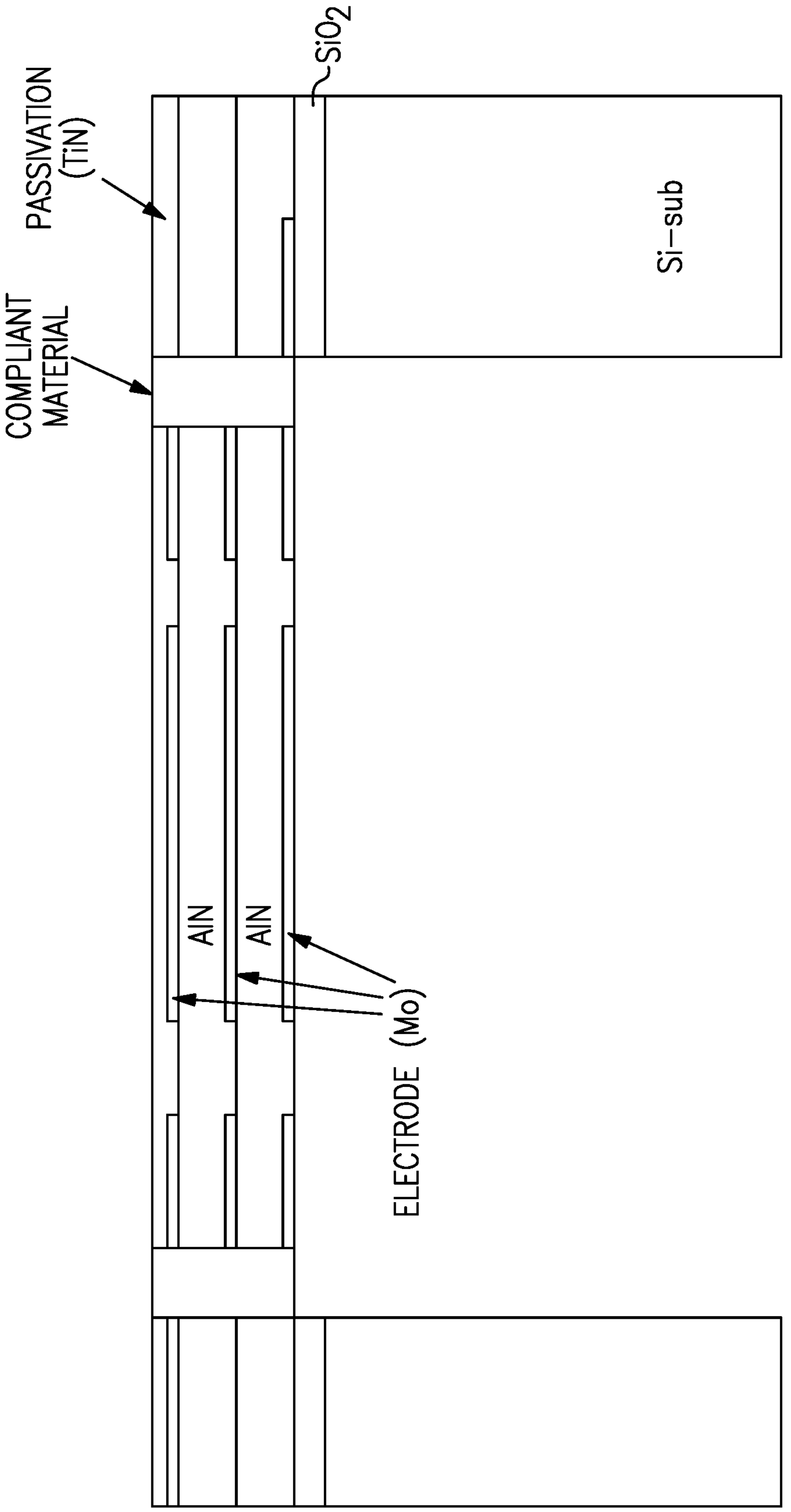
Figure 7H:
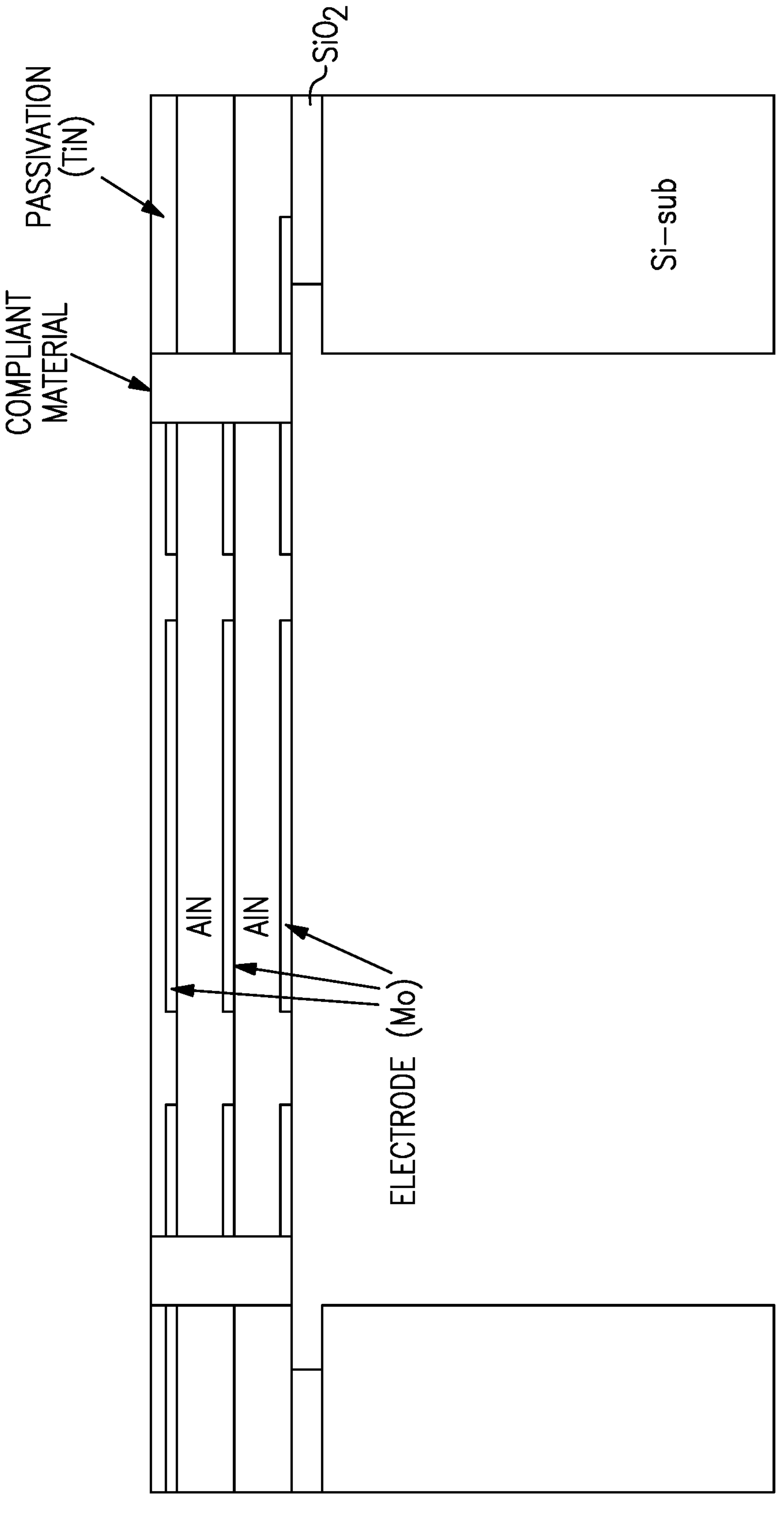
Figure 7I:
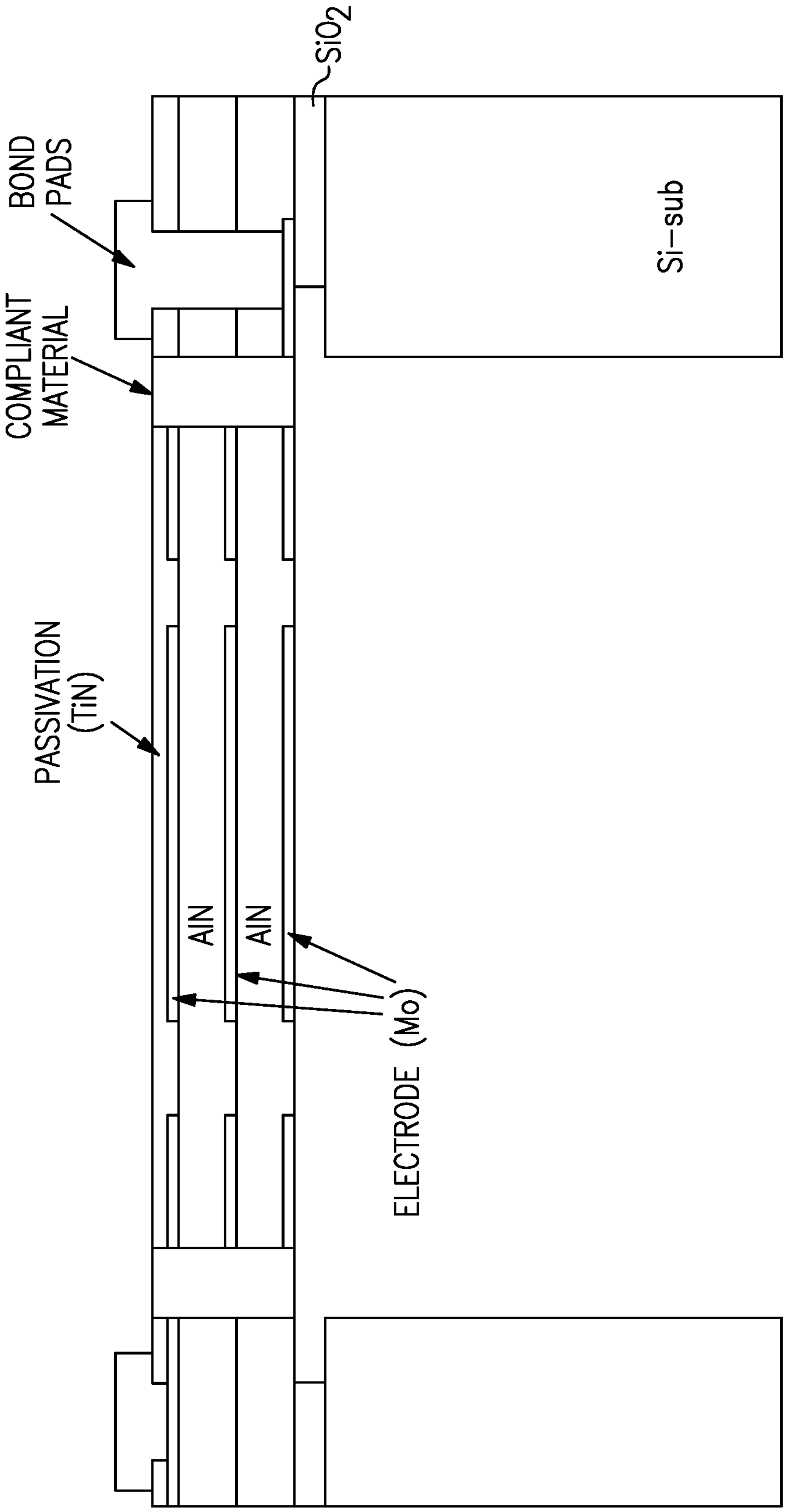

A process for fabricating a diaphragm PMM with compliant anchors as disclosed herein is illustrated in FIGS. 7A-7I. In a first act, there is provided a substrate, for example, a silicon wafer (FIG. 7A). Next, a layer of dielectric, for example, $SiO_2$ is deposited on the upper surface of the substrate, followed by the layers of piezoelectric material and associated electrode layers, which may be metal layers deposited by PVD or another suitable process and then patterned, and the upper passivation layer (FIG. 7B). Etching, for example, dry etching, is then performed through the passivation layer, piezoelectric layers, and electrode layers to define a trench for the compliant anchor material, while the center of the piezoelectric membrane remains attached to the substrate by the layer of $SiO_2$ (FIG. 7C). A tether region including a portion of the passivation layer, piezoelectric layers, and electrode layers remains unetched (FIG. 7D). A layer of compliant material, for example, any of the materials discussed above is then deposited and fills the previously etched trench (FIG. 7E) and covers the passivation layer. The method of deposition of the compliant material will depend on the type of material(s) used for the compliant material. The compliant material that is on top of the passivation layer is then removed, for example, by dry or wet etching or by chemical-mechanical polishing so that the compliant material remains only in the trench (FIG. 7F). The back side of the substrate is then etched, for example, with deep reactive ion etching (DRIE) to form a cavity beneath the diaphragm including the membrane of piezoelectric films, electrodes, passivation layer, and compliant material (FIG. 7G). Additional etching of the $SiO_2$ attaching the diaphragm to the substrate may be performed by wet etching or dry etching to increase the diameter of the movable portion of the diaphragm and increase the sensitivity of the PMM (FIG. 7H). Bond pads are then formed by etching through the passivation layer or passivation layer and piezoelectric material layers to expose the appropriate portions of the electrodes and then depositing a conductive material, for example, copper or another metal by PVD and patterning, electroplating, or another suitable method to provide external contacts in electrical communication with the electrodes (FIG. 7I). In some embodiments an additional layer of polymer (not shown) may be deposited on the passivation layer for further protection of the PMM.

Figure 8A:
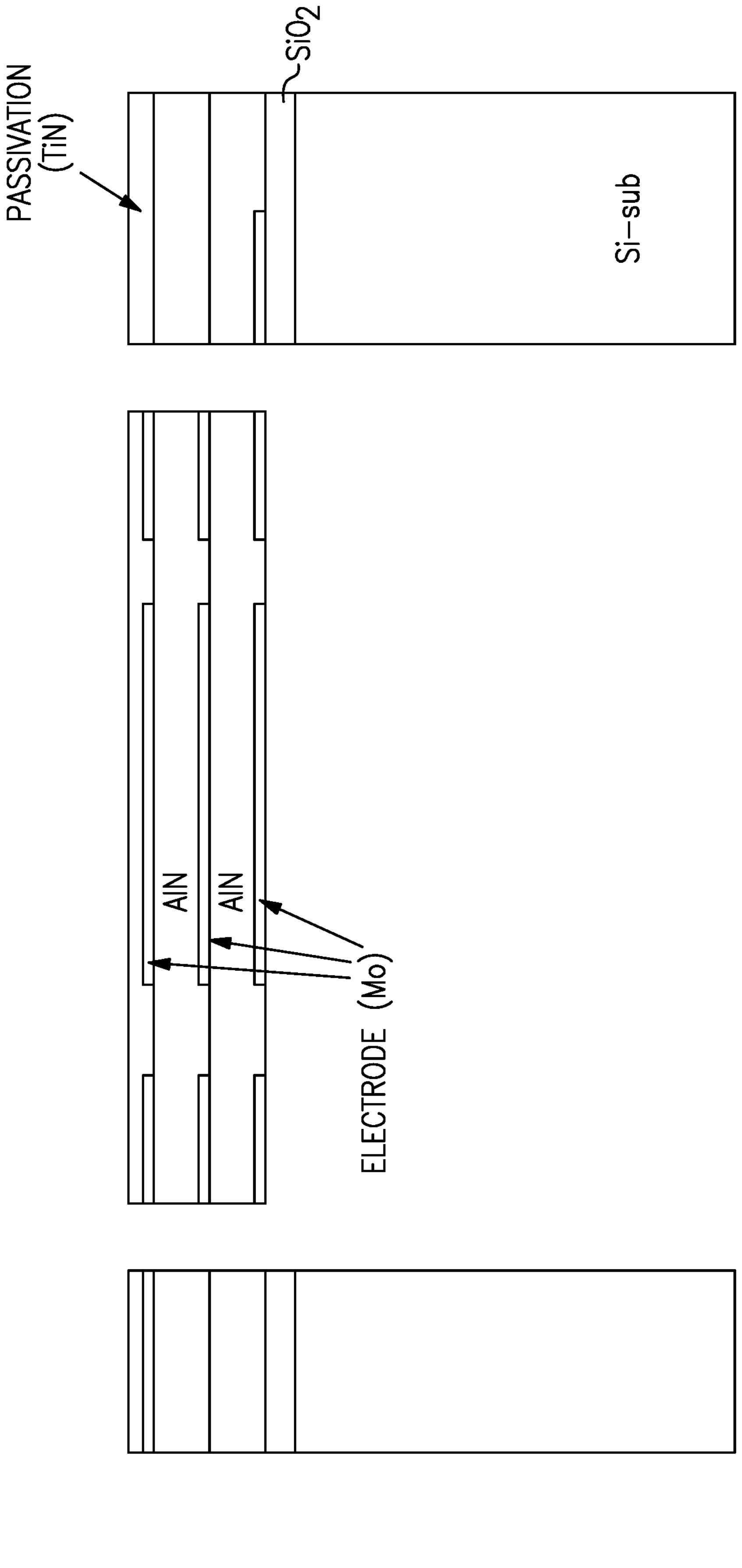
FIGS. 8A-8D illustrate steps in another process for fabricating a PMM including a compliant anchor as disclosed herein.
Figure 8B:
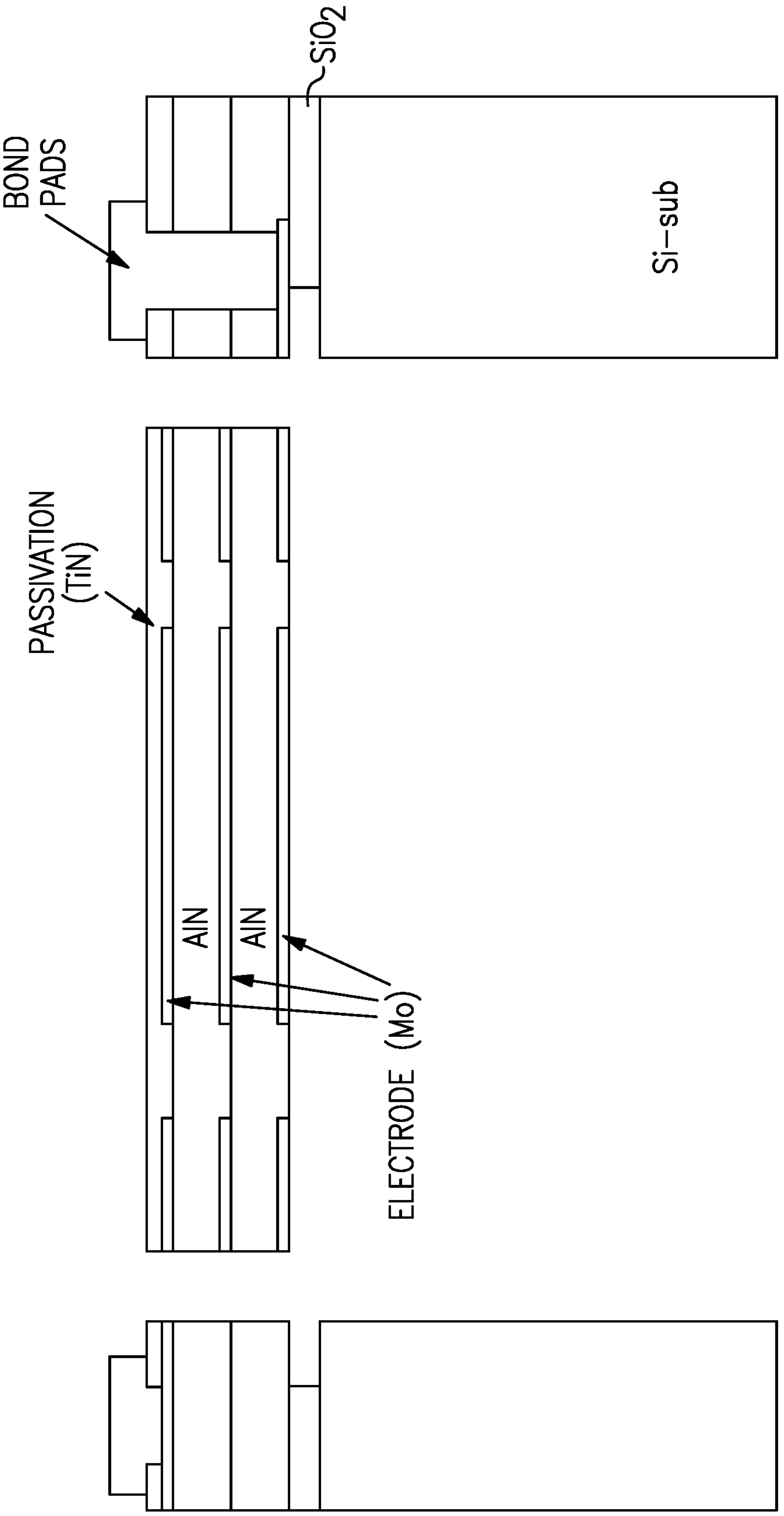
Figure 8C:
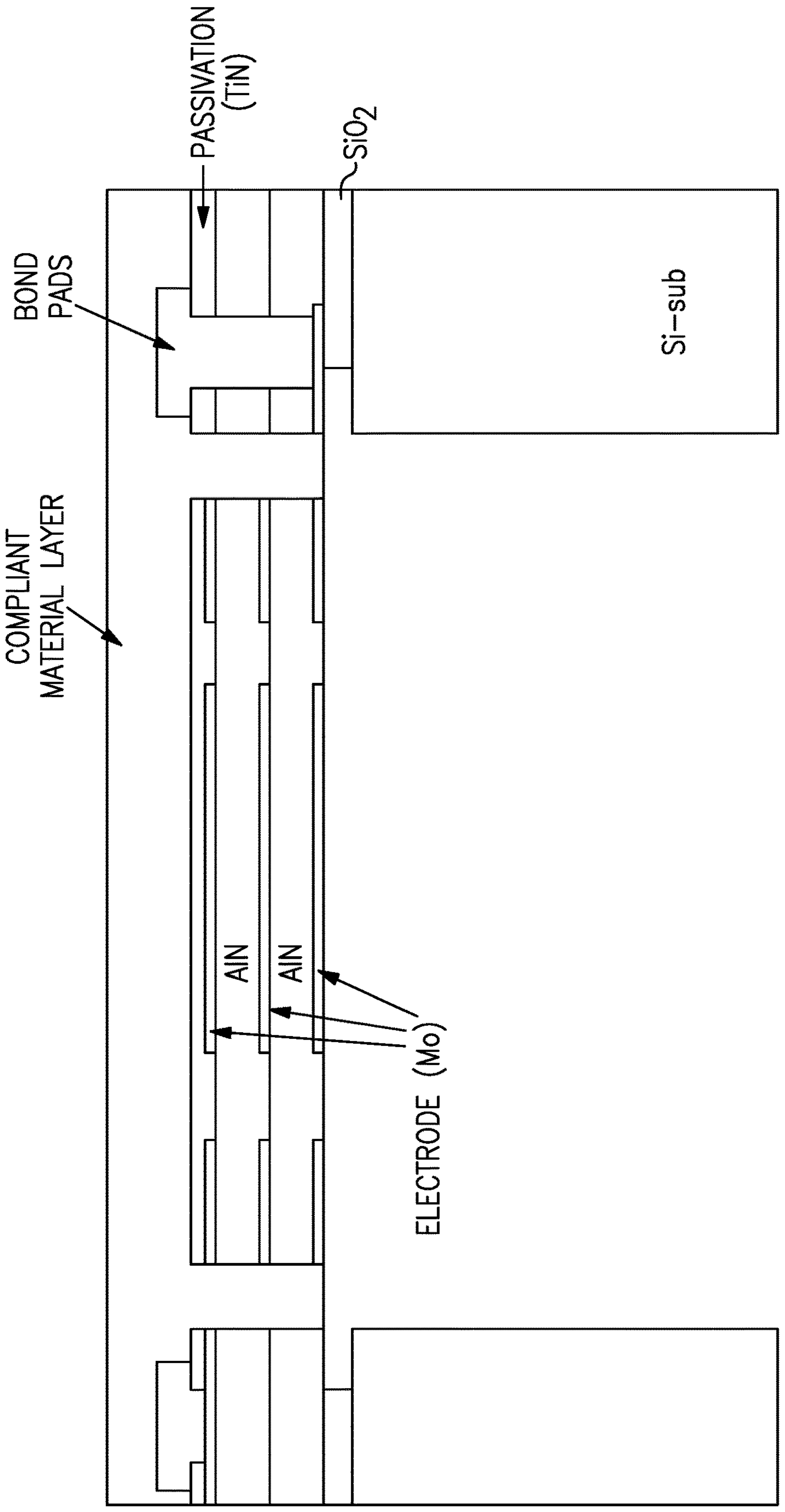
Figure 8D:
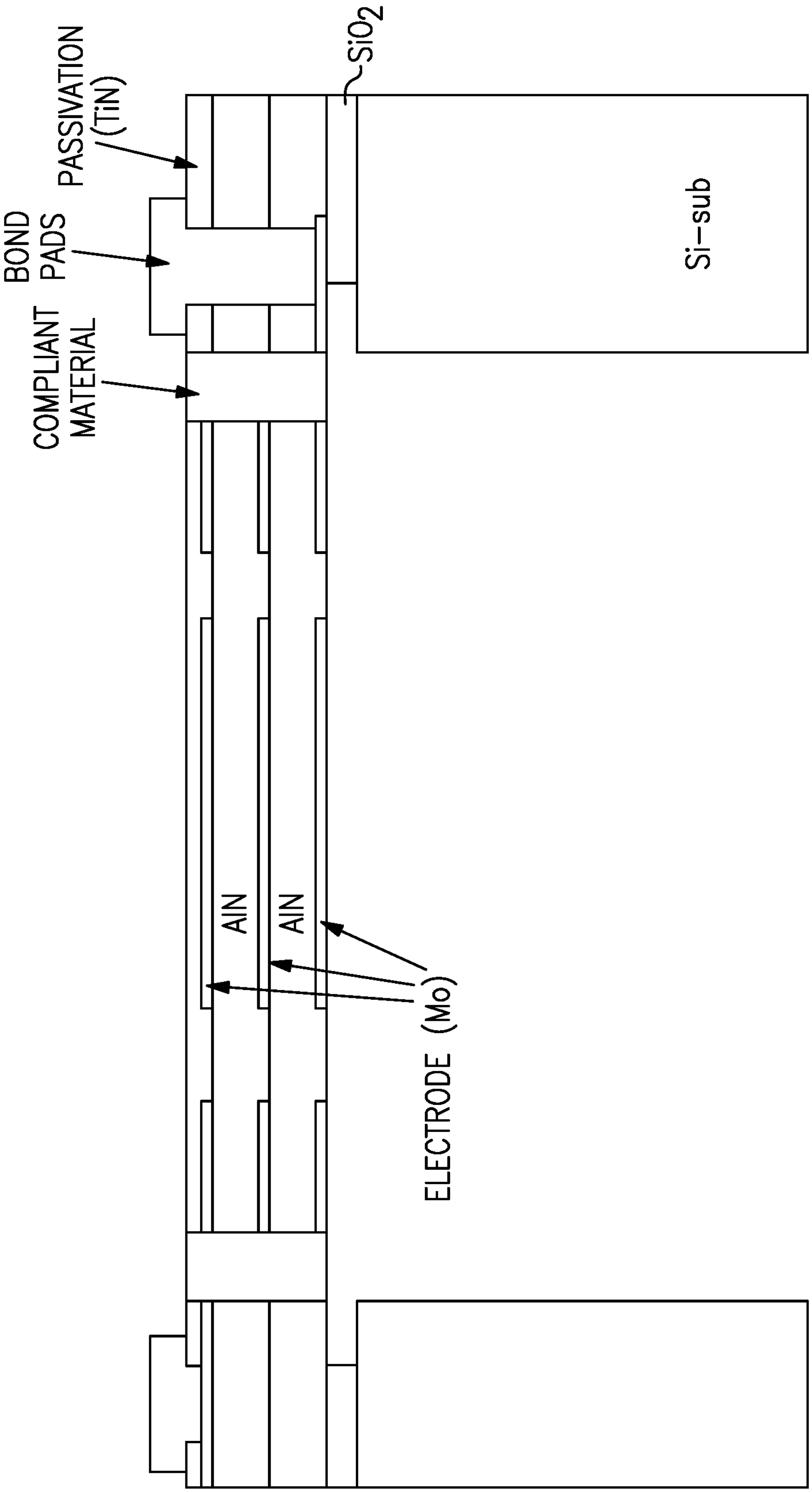

Another process for fabricating a diaphragm PMM with compliant anchors as disclosed herein is illustrated in FIGS. 8A-8D. In this alternative process, the first steps are the same as illustrated in FIGS. 7A-7D above, so these steps will not be described again here. After etching the trench for the compliant material as illustrated in FIGS. 7C and 7D, the rear side of the substrate is etched, for example, using DRIE to form a cavity beneath the diaphragm including the membrane of piezoelectric films, electrodes, passivation layer, and compliant material (FIG. 8A). The center portion of the diaphragm remains attached to the substrate by the tether (FIG. 7C). Additional etching of the $SiO_2$ attaching the diaphragm to the substrate may be performed by wet etching or dry etching to increase the diameter of the movable portion of the diaphragm and increase the sensitivity of the PMM. Bond pads are then formed by etching through the passivation layer or passivation layer and piezoelectric material layers to expose the appropriate portions of the electrodes and then depositing a conductive material, for example, copper or another metal by PVD and patterning, electroplating, or another suitable method to provide external contacts in electrical communication with the electrodes (FIG. 8B). A layer of compliant material, for example, any of the materials discussed above is then deposited and fills the previously etched trench and covers the passivation layer and bond pads (FIG. 8C). The method of deposition of the compliant material will depend on the type of material(s) used for the compliant material. The compliant material that is on top of the passivation layer and bond pads is then removed, for example, by dry or wet etching or by chemical-mechanical polishing so that the compliant material remains only in the trench (FIG. 8D). In some embodiments, the compliant material layer may be left covering the passivation layer, but via holes may be etched to expose the bond pads.

Figure 9:
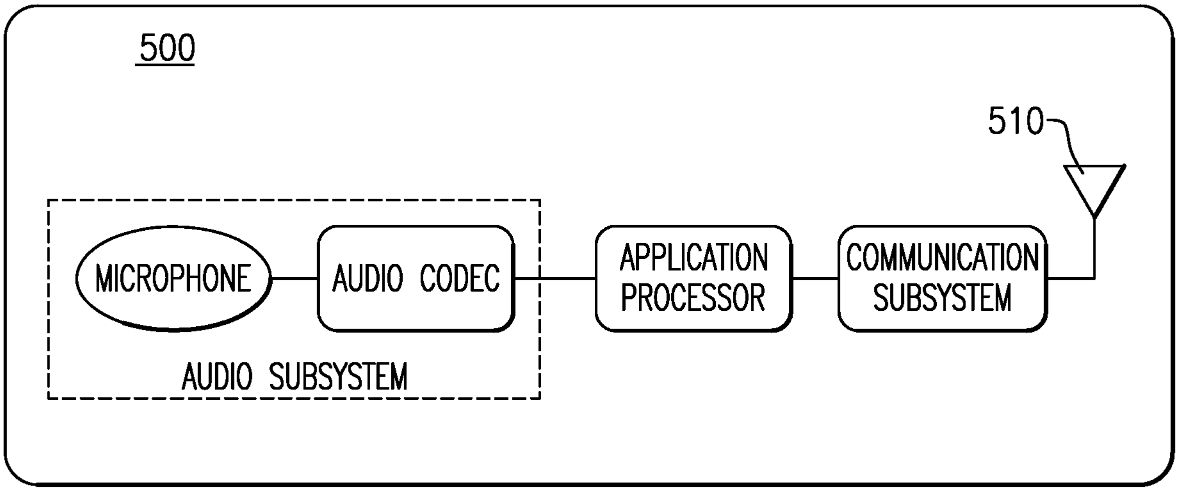
FIG. 9 is a block diagram of one example of a wireless device and that can include one or more piezoelectric MEMS microphones according to aspects of the present disclosure.

Examples of MEMS microphones as disclosed herein can be implemented in a variety of packaged modules and devices. FIG. 9 is a schematic block diagrams of an illustrative device 500 according to certain embodiments.

The wireless device 500 can be a cellular phone, smart phone, tablet, modem, communication network or any other portable or non-portable device configured for voice or data communication. The wireless device 500 can receive and transmit signals from the antenna 510.

The wireless device 500 may include one or more microphones as disclosed herein. The one or more microphones may be included in an audio subsystem including, for example, an audio codec. The audio subsystem may be in electrical communication with an application processor and communication subsystem that is in electrical communication with the antenna 510. As would be recognized to one of skill in the art, the wireless device would typically include a number of other circuit elements and features that are not illustrated, for example, a speaker, an RF transceiver, baseband sub-system, user interface, memory, battery, power management system, and other circuit elements.

The principles and advantages of the embodiments can be used for any systems or apparatus, such as any uplink wireless communication device, that could benefit from any of the embodiments described herein. The teachings herein are applicable to a variety of systems. Although this disclosure includes some example embodiments, the teachings described herein can be applied to a variety of structures. Any of the principles and advantages discussed herein can be implemented in association with RF circuits configured to process signals in a range from about 30 kHz to 10 GHz, such as in the X or Ku 5G frequency bands.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a speaker, a smart speaker, a hearing aid receiver, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A piezoelectric microelectromechanical system microphone comprising:

a support substrate;

a circular diaphragm including a piezoelectric material attached to the support substrate and configured to deform and generate an electrical potential responsive to impingement of sound waves on the diaphragm; and a compliant anchor extending about a majority of a perimeter of the diaphragm, having a width of between 0% and about 15% of a radius of the diaphragm, and formed of a material with a greater compliance than a compliance of the piezoelectric material, the compliant anchor defined in the diaphragm in an anchor region between the piezoelectric material of the diaphragm and the support substrate to improve sensitivity and reduce residual stress impact of the piezoelectric microelectromechanical system microphone.

2. The piezoelectric microelectromechanical system microphone of claim 1 wherein the compliant anchor has a length and substantially same width along an entirety of the length.

3. The piezoelectric microelectromechanical system microphone of claim 1 wherein the compliant anchor has a same height as a remainder of the diaphragm.

4. The piezoelectric microelectromechanical system microphone of claim 1 further comprising a sensing electrode including an inner sensing electrode disposed proximate a center of the diaphragm and an outer sensing electrode disposed proximate a perimeter of the diaphragm.

5. The piezoelectric microelectromechanical system microphone of claim 4 wherein the anchor region surrounds the outer sensing electrode.

6. The piezoelectric microelectromechanical system microphone of claim 1 wherein the compliant anchor is formed of a polymer.

7. The piezoelectric microelectromechanical system microphone of claim 6 wherein the compliant anchor is formed of one of polyimide, polymethylmethacrylate, or polydimethylsiloxane.

8. The piezoelectric microelectromechanical system microphone of claim 1 wherein the compliant anchor is formed of a dielectric material.

9. The piezoelectric microelectromechanical system microphone of claim 8 wherein the compliant anchor is formed of silicon dioxide.

10. The piezoelectric microelectromechanical system microphone of claim 1 wherein the compliant anchor is formed of a semiconductor.

11. The piezoelectric microelectromechanical system microphone of claim 1 wherein the compliant anchor is formed of silicon.

12. An electronics device module including the piezoelectric microelectromechanical system microphone of claim 1.

13. An electronic device including the electronic device module of claim 12.

14. A telephone including the electronic device module of claim 12.

15. A piezoelectric microelectromechanical system microphone comprising:

a support substrate;

a diaphragm including a piezoelectric material attached to the support substrate and configured to deform and generate an electrical potential responsive to impingement of sound waves on the diaphragm; and a compliant anchor formed of a polymer with a greater compliance than a compliance of the piezoelectric material, the compliant anchor defined in the diaphragm in an anchor region between the piezoelectric material of the diaphragm and the support substrate to improve sensitivity and reduce residual stress impact of the piezoelectric microelectromechanical system microphone.

16. A piezoelectric microelectromechanical system microphone comprising:

a support substrate;

a diaphragm including a piezoelectric material attached to the support substrate and configured to deform and generate an electrical potential responsive to impingement of sound waves on the diaphragm; and a compliant anchor formed of a semiconductor with a greater compliance than a compliance of the piezoelectric material, the compliant anchor defined in the diaphragm in an anchor region between the piezoelectric material of the diaphragm and the support substrate to improve sensitivity and reduce residual stress impact of the piezoelectric microelectromechanical system microphone.

* * * * *